Figure 34:
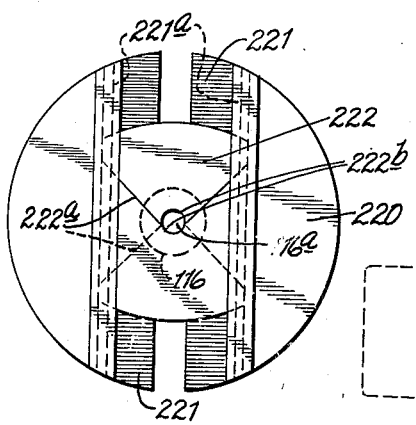

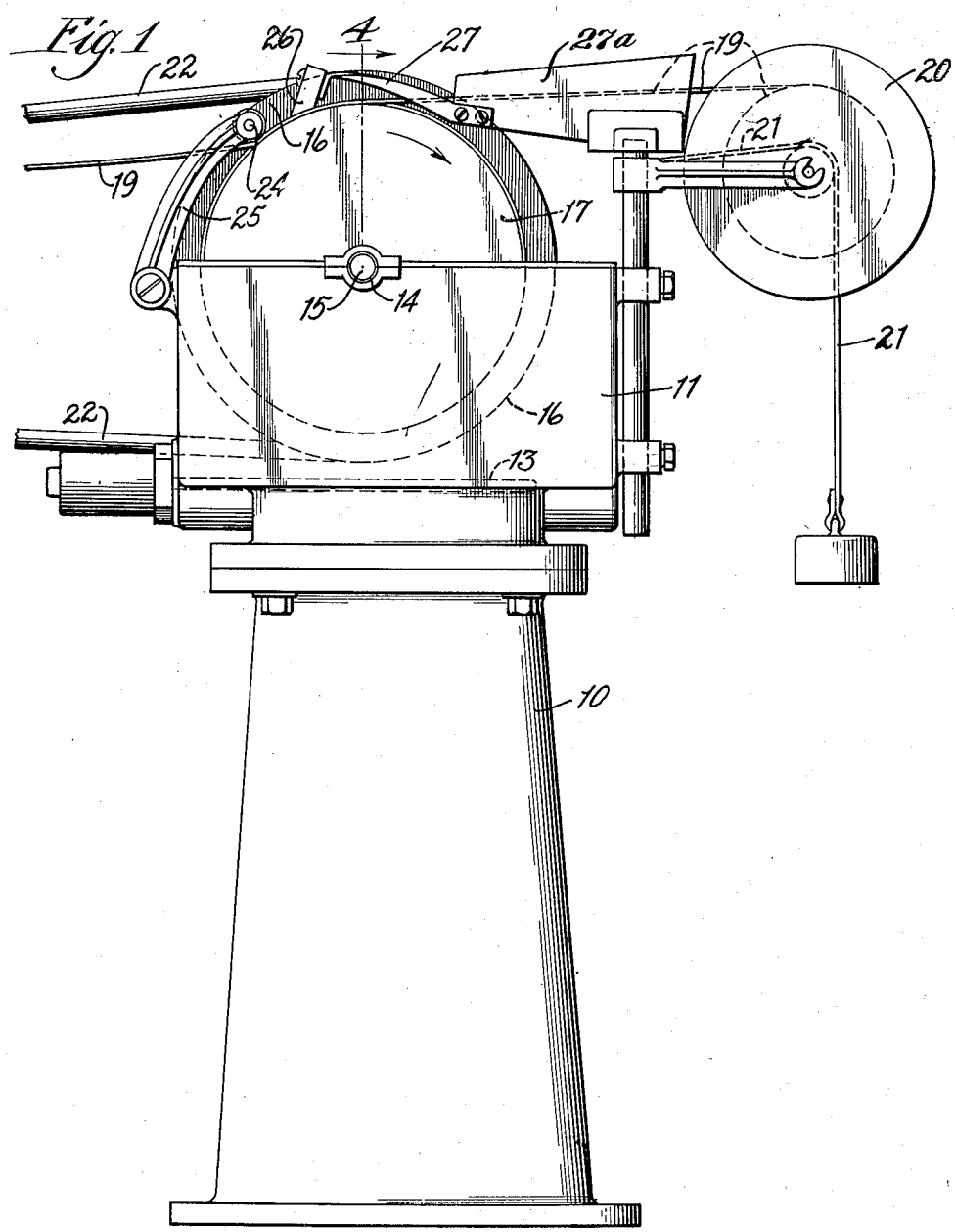

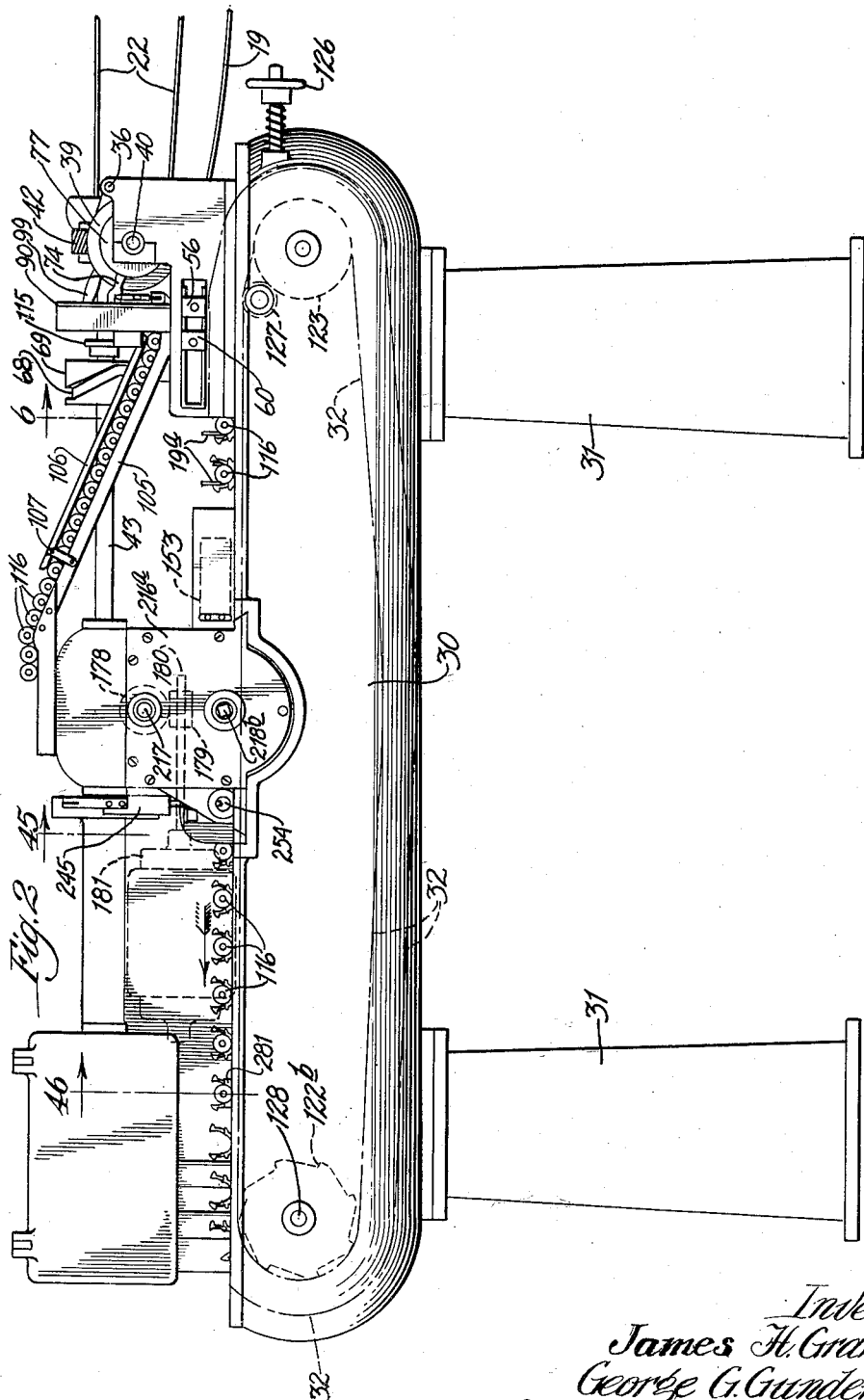

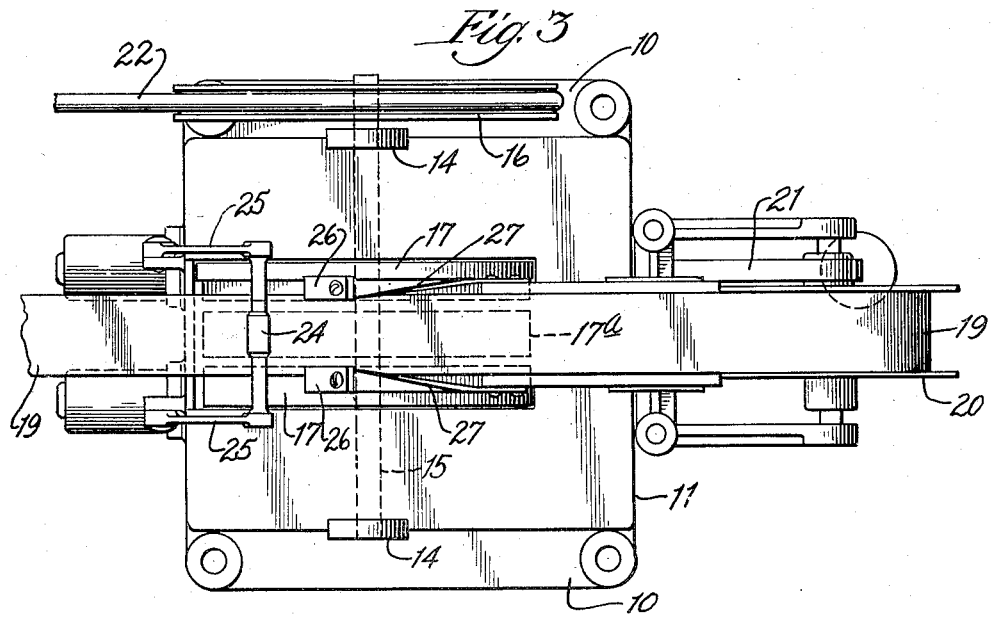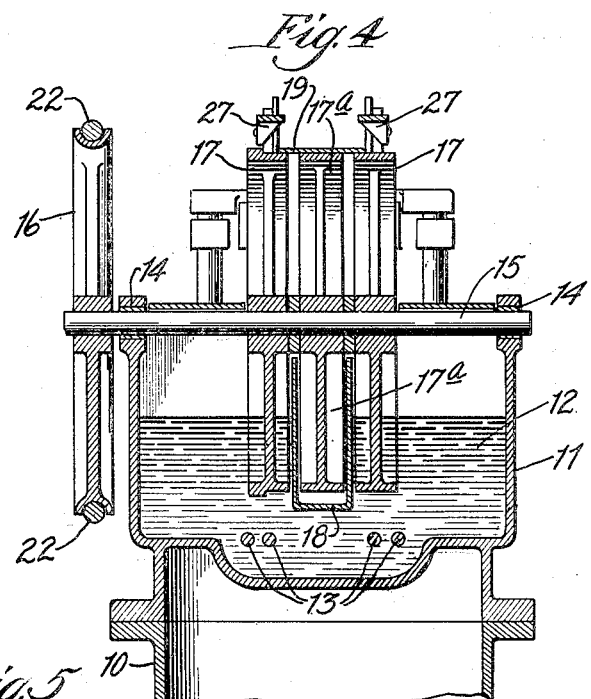

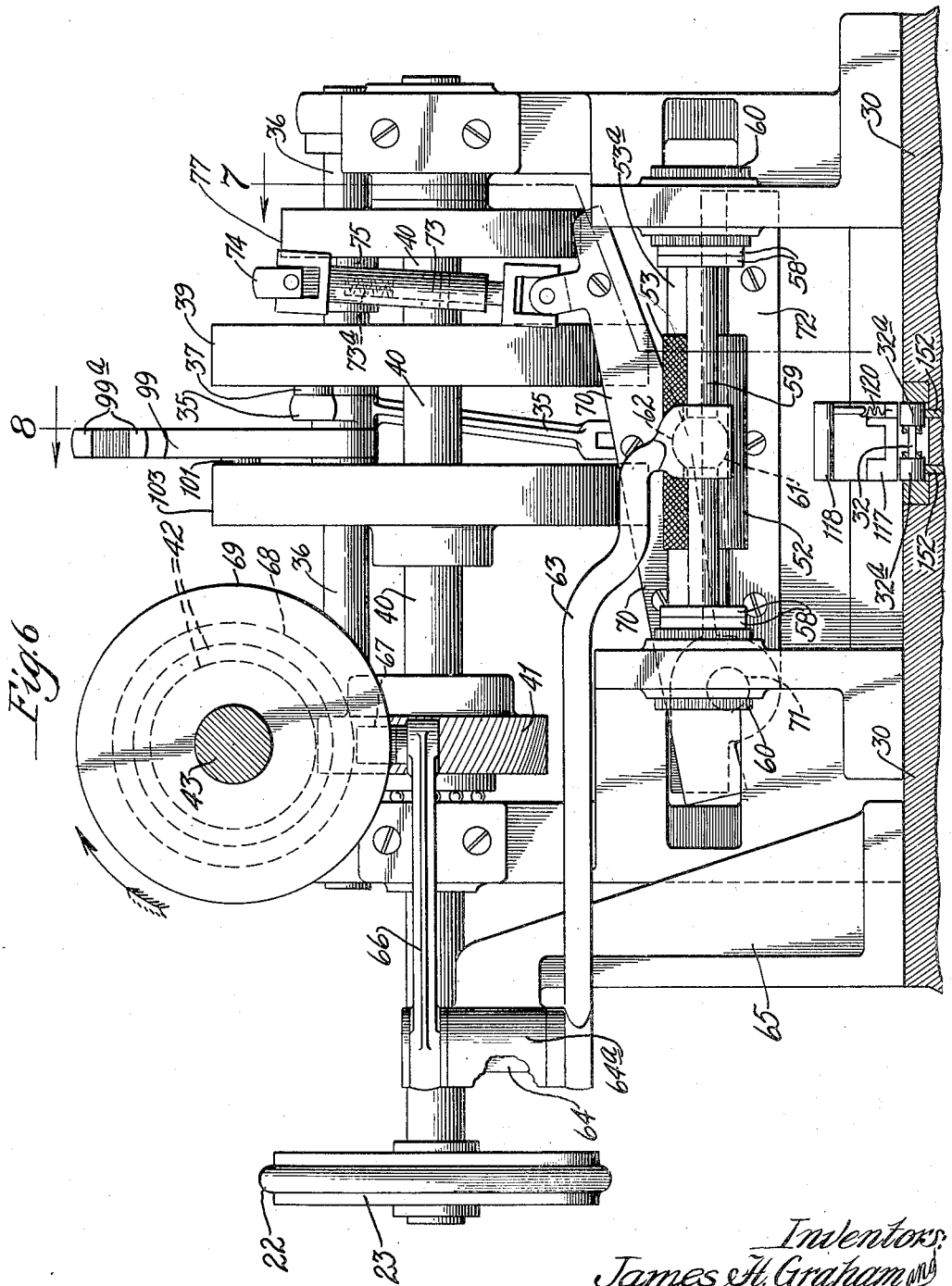

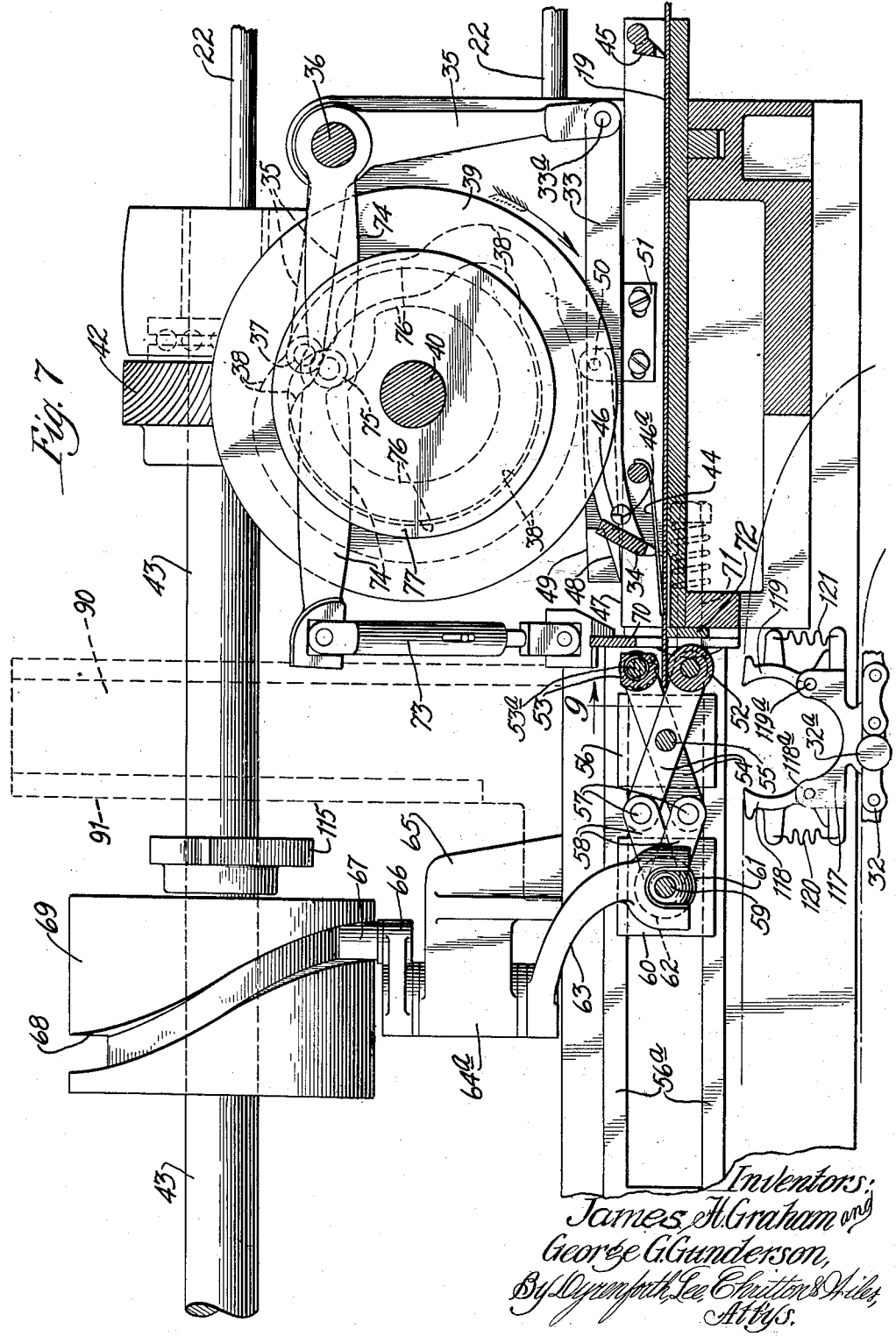

Aug. 18, 1931.  J. H. GRAHAM ET AL  1,819,746
CORE WRAPPING MACHINE
Filed April 2, 1928  21 Sheets-Sheet 6
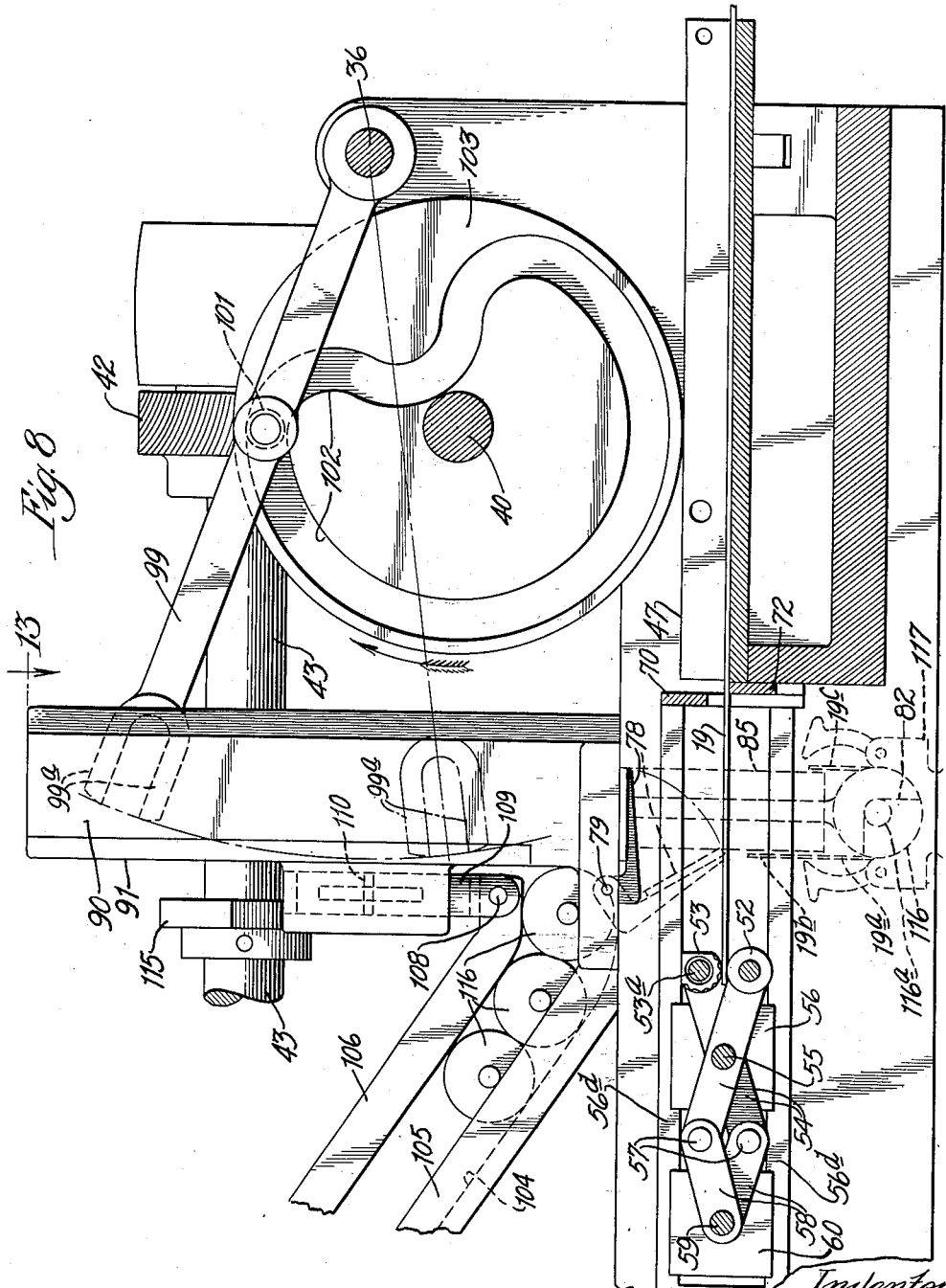

Aug. 18, 1931.  J. H. GRAHAM ET AL  1,819,746
CORE WRAPPING MACHINE
Filed April 2, 1928   21 Sheets-Sheet 7
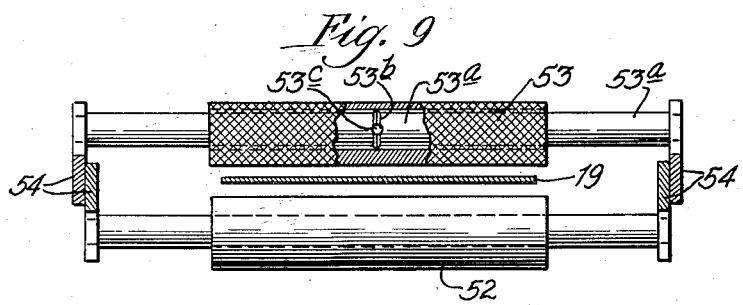
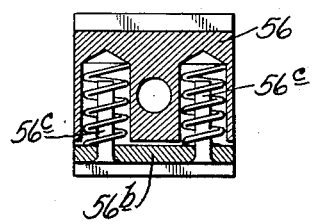
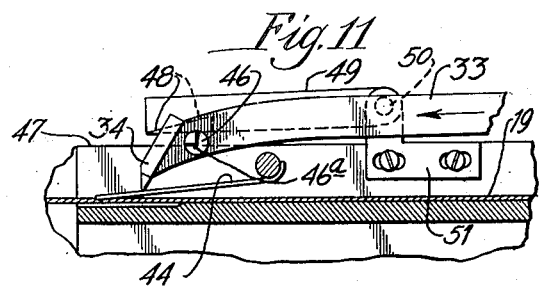
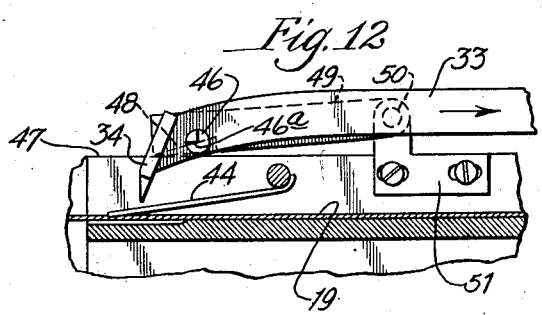
Inventors:
James H. Graham and
George G. Gunderson,

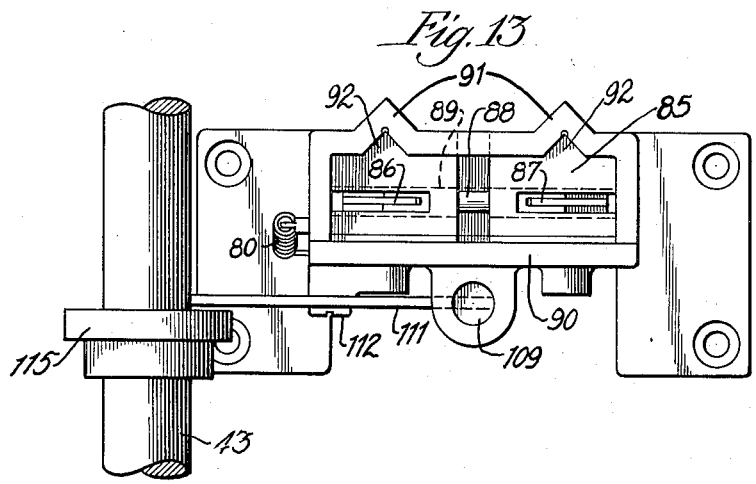
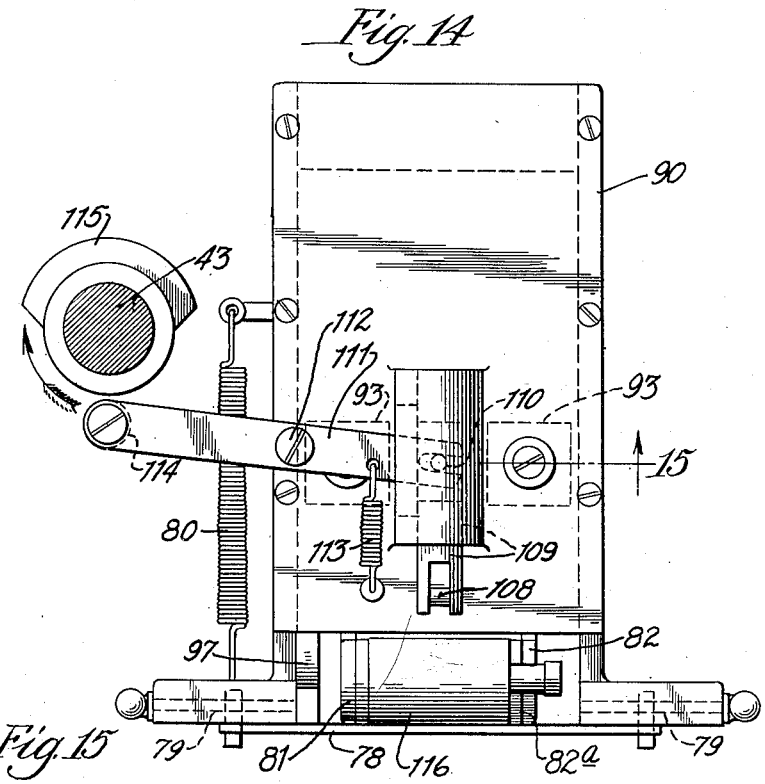
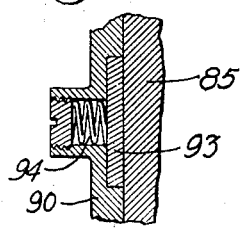

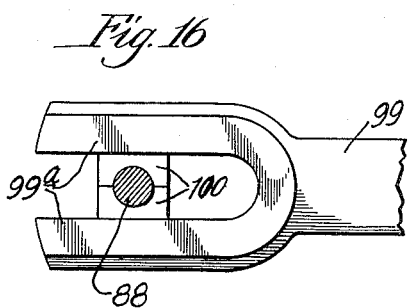
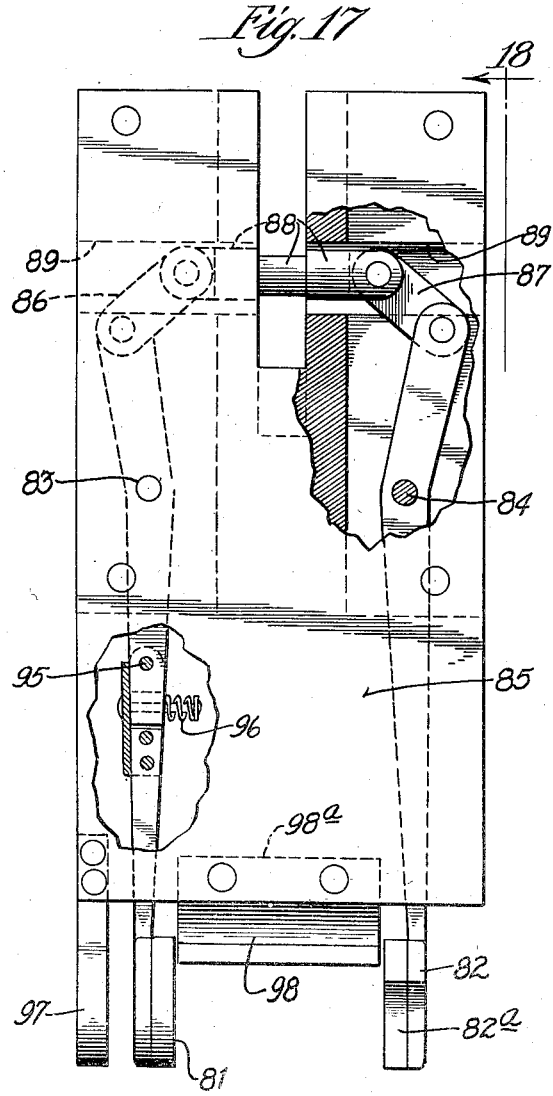
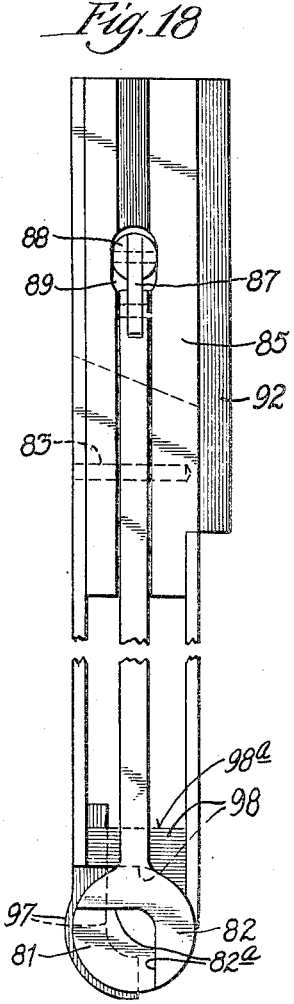

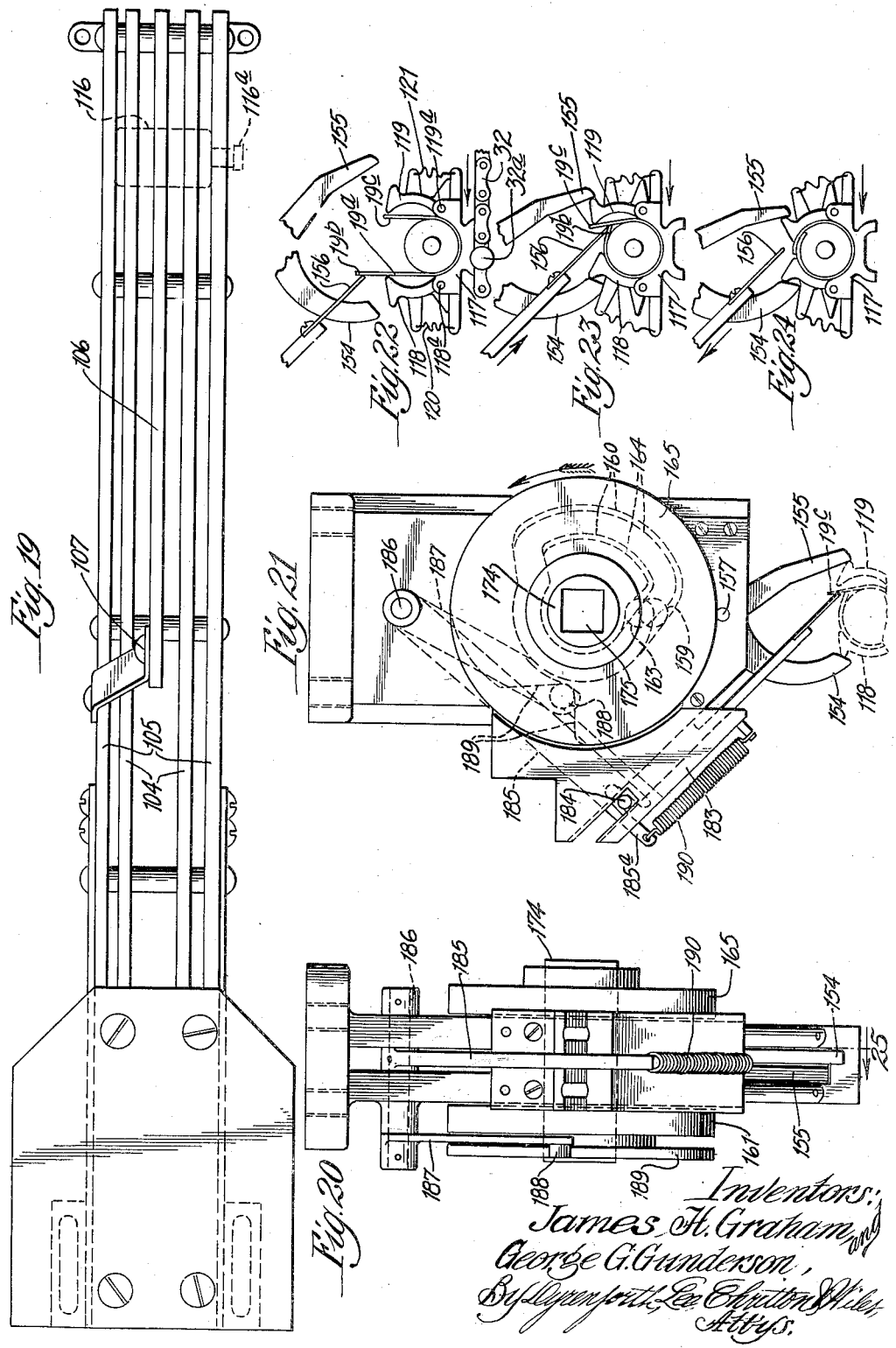

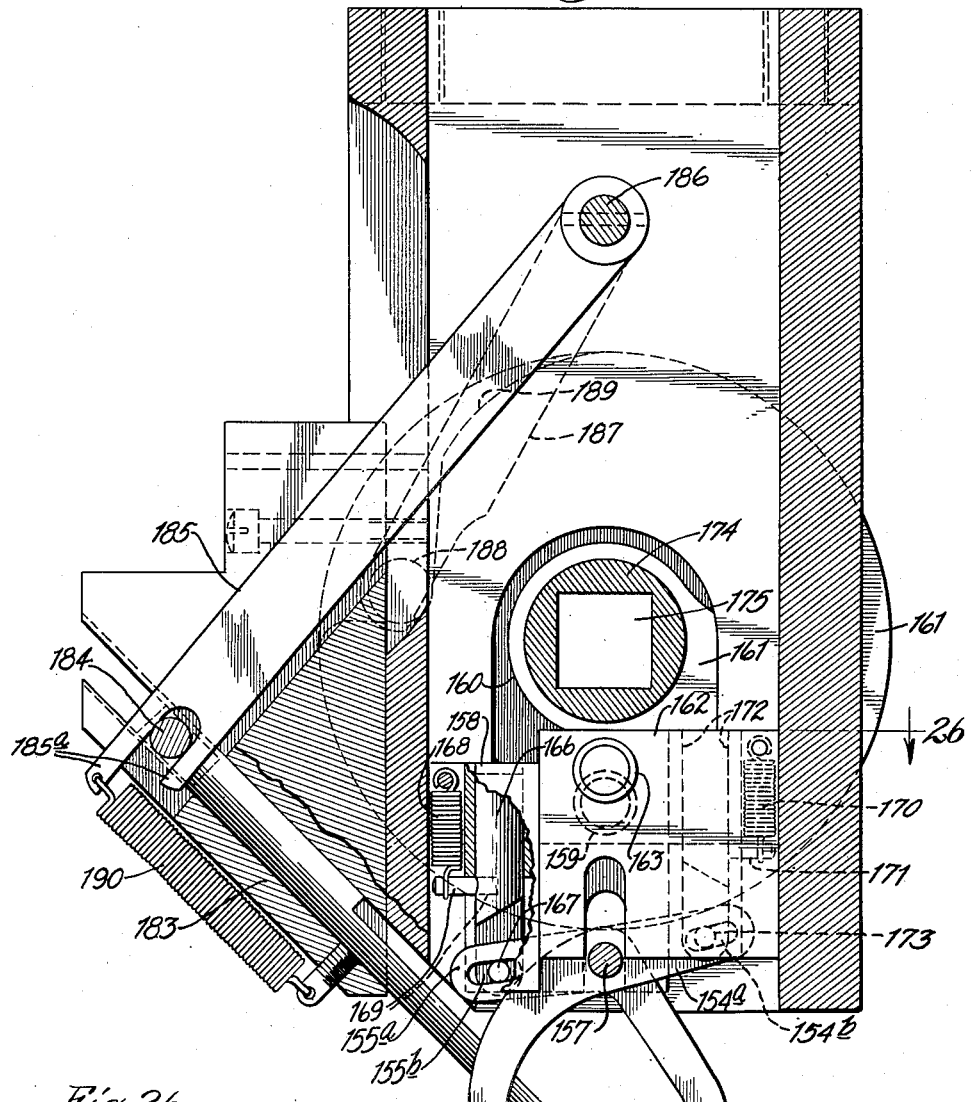
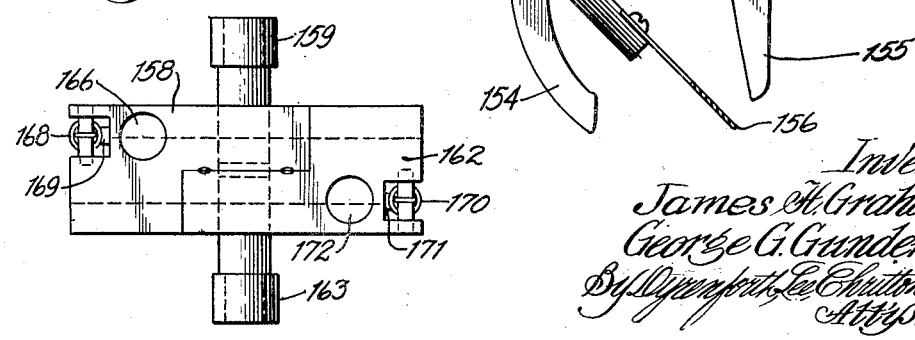

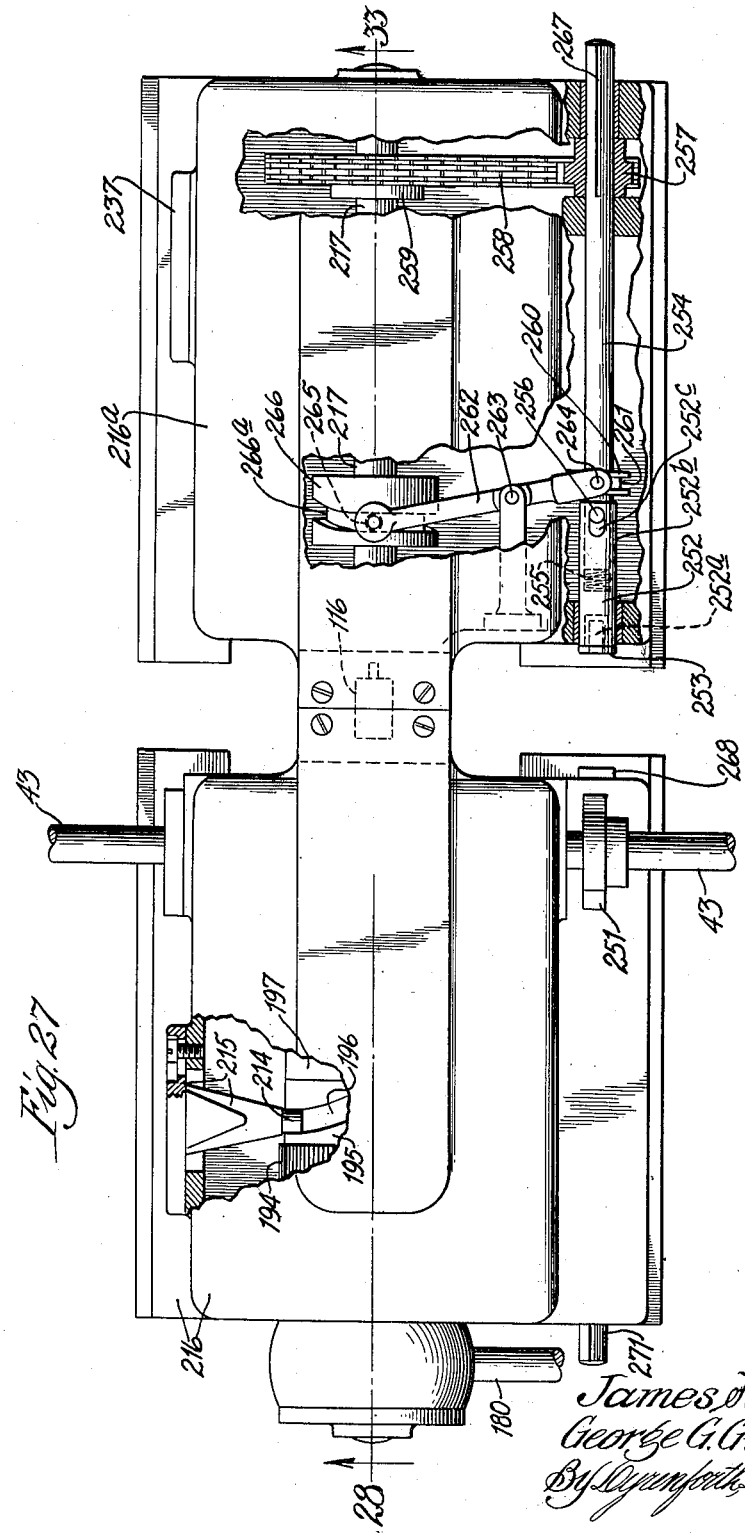

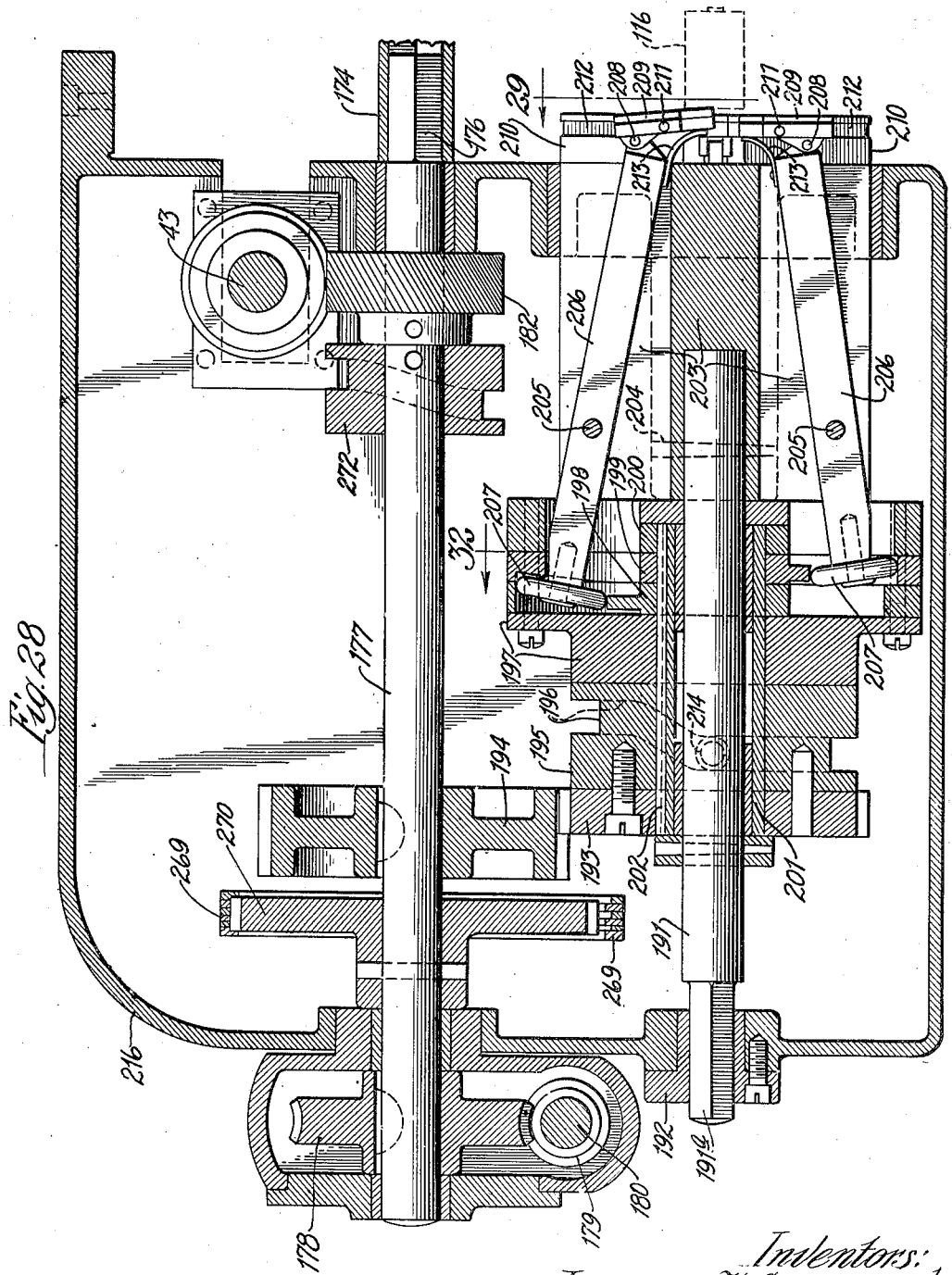

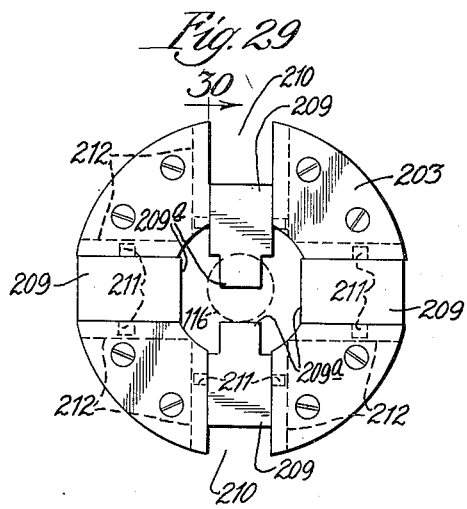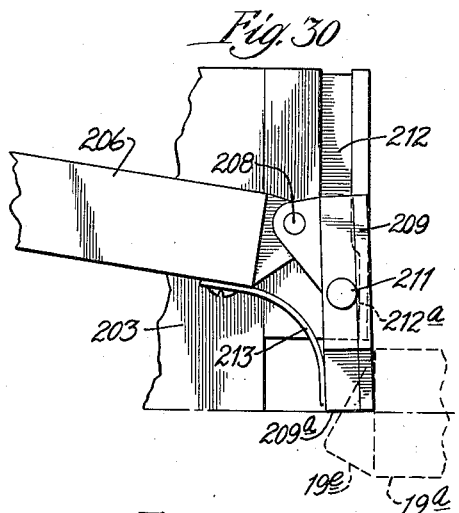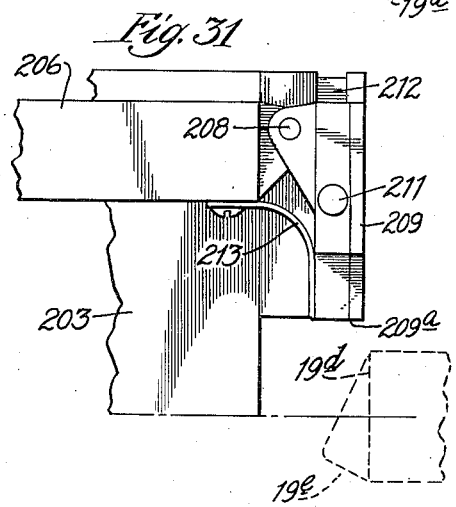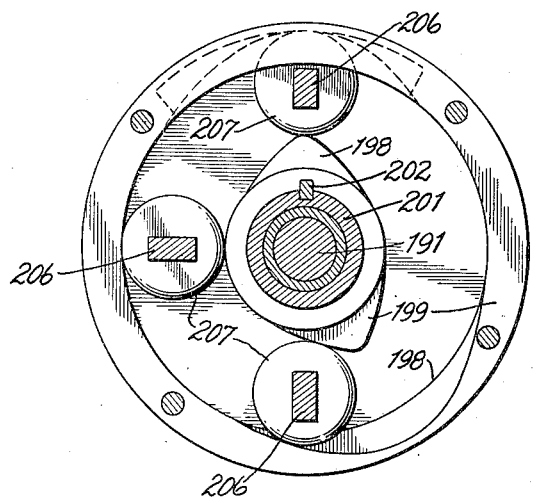

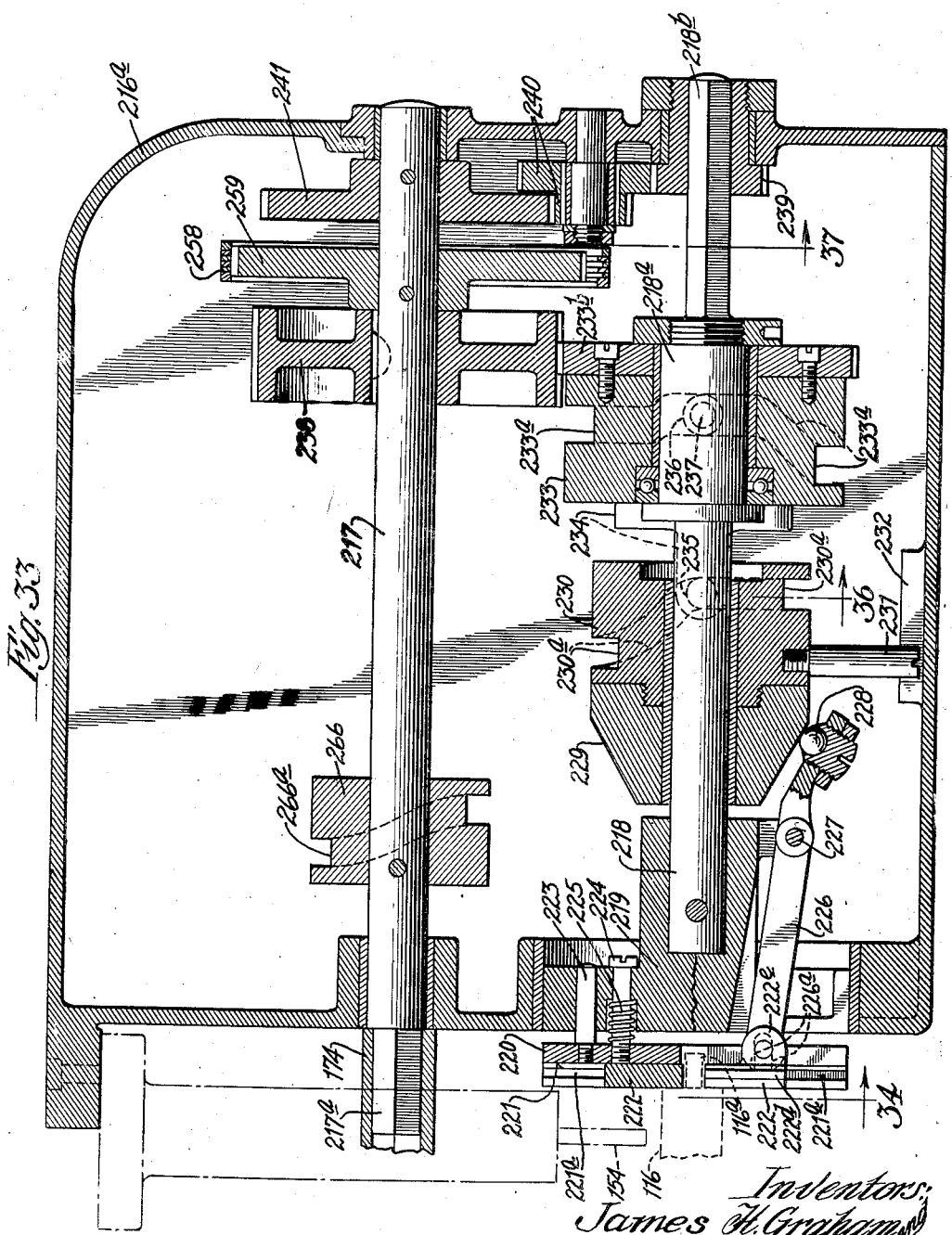

Aug. 18, 1931.     J. H. GRAHAM ET AL     1,819,746
CORE WRAPPING MACHINE
Filed April 2, 1928      21 Sheets-Sheet 16

Inventors:
James H. Graham and
George G. Gunderson,

Aug. 18, 1931.    J. H. GRAHAM ET AL    1,819,746
CORE WRAPPING MACHINE
Filed April 2, 1928    21 Sheets-Sheet 17
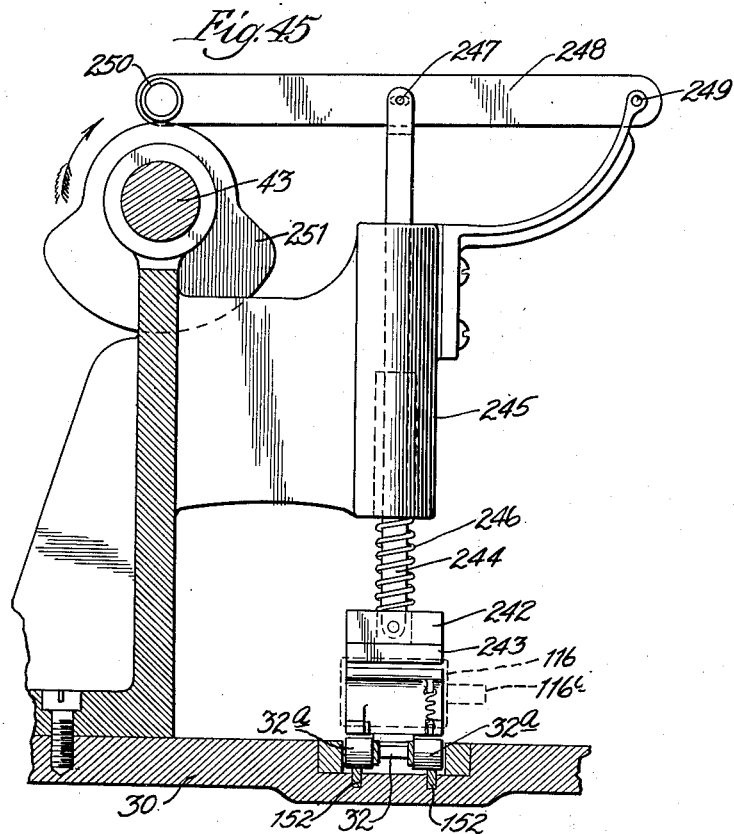
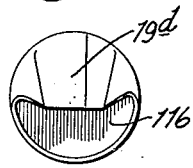
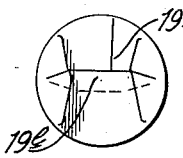
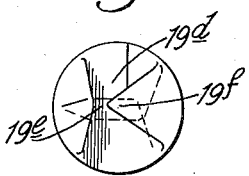
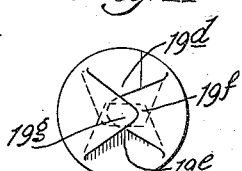
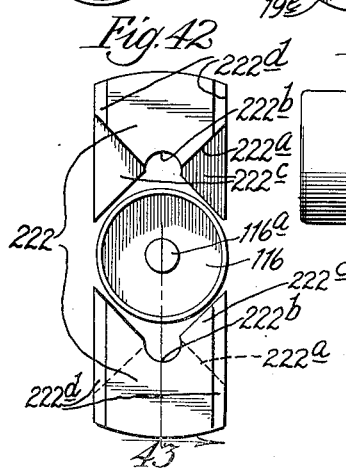
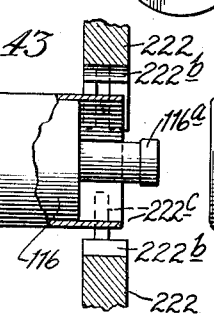
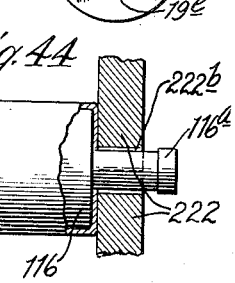
Inventors:
James H. Graham and
George G. Gunderson,
By Dynforth, Lee, Chritton & Wiles
Attys.

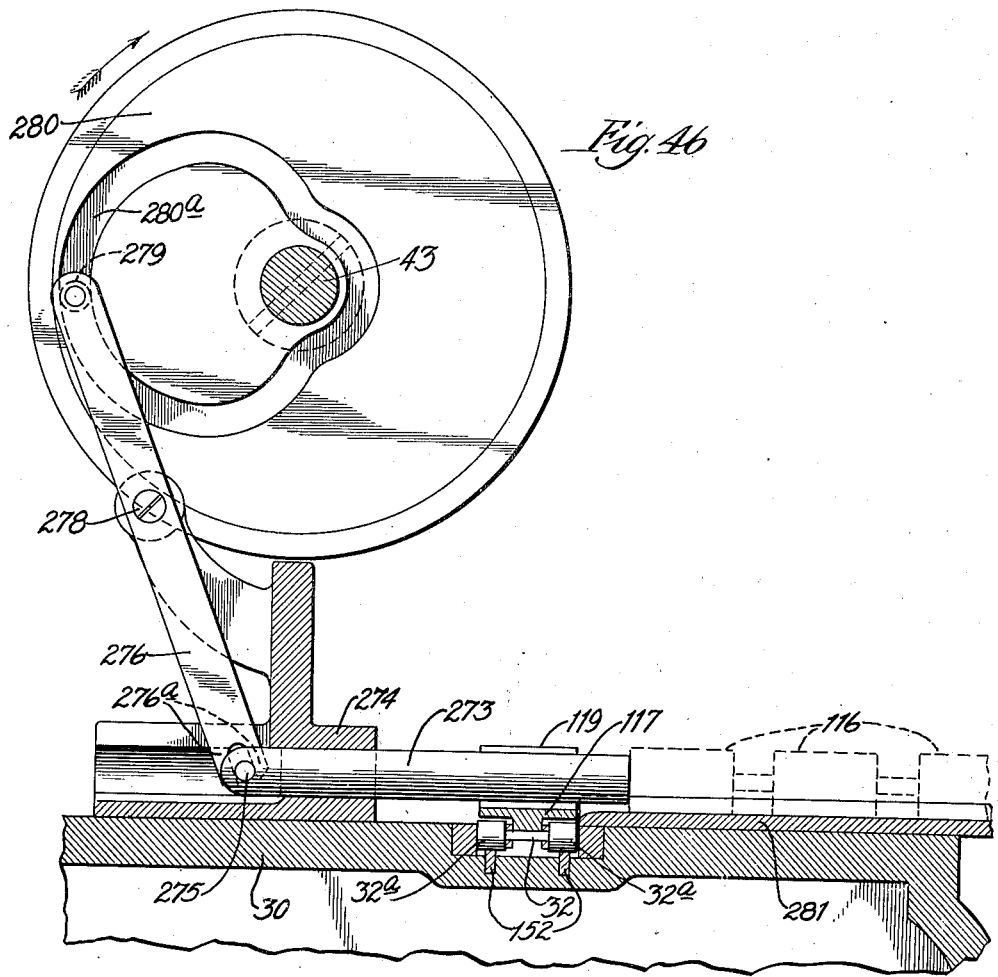

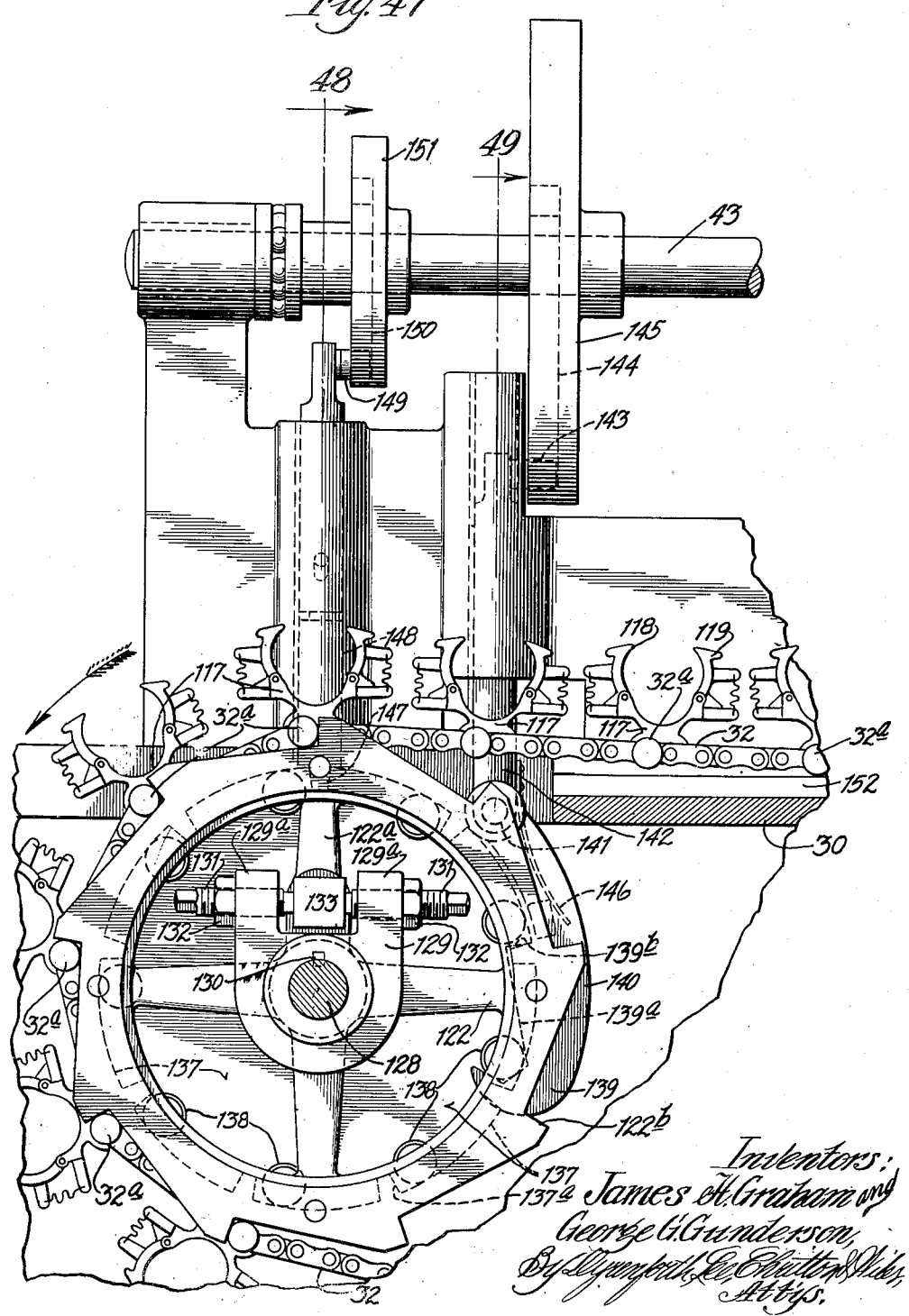

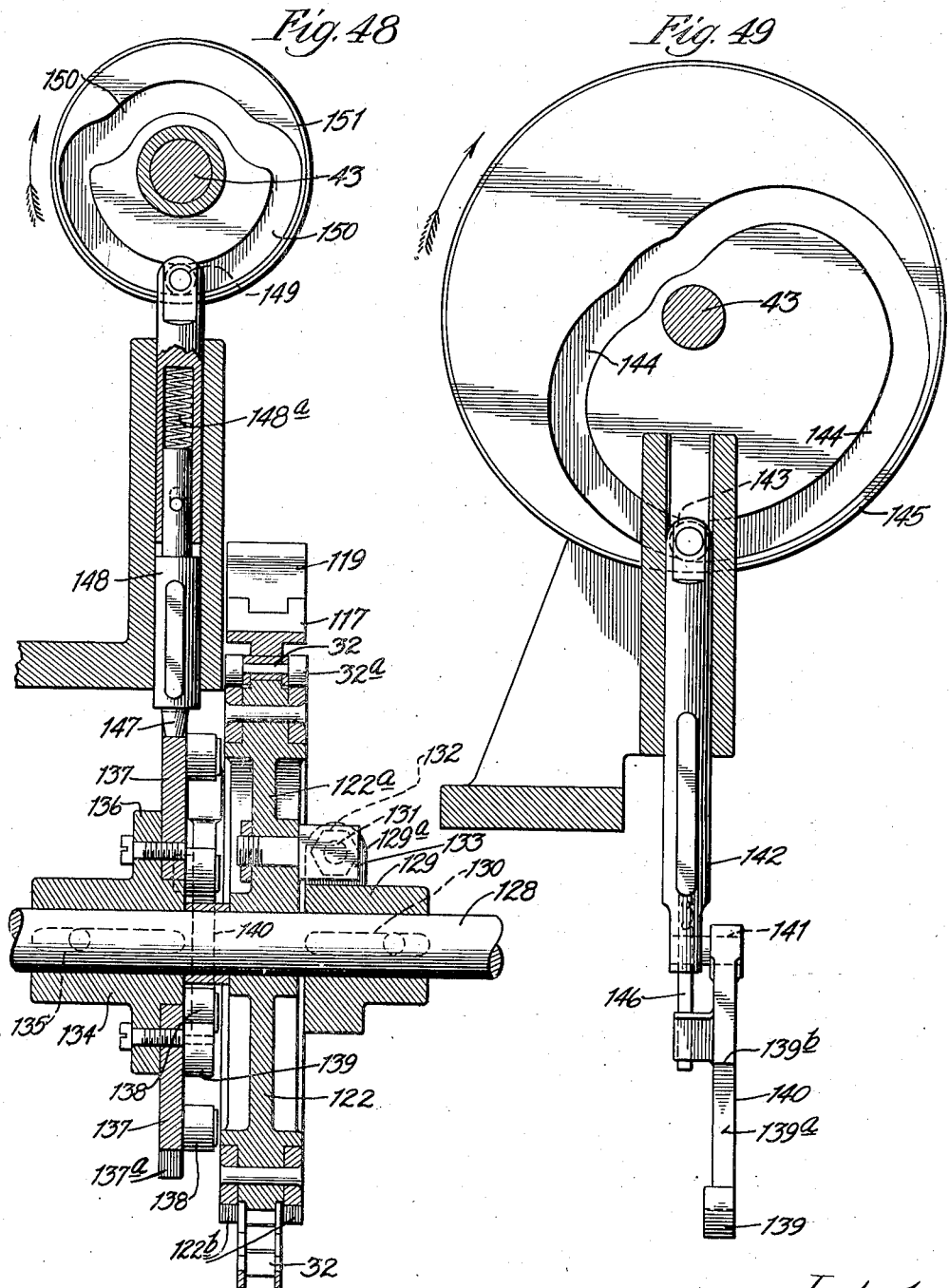

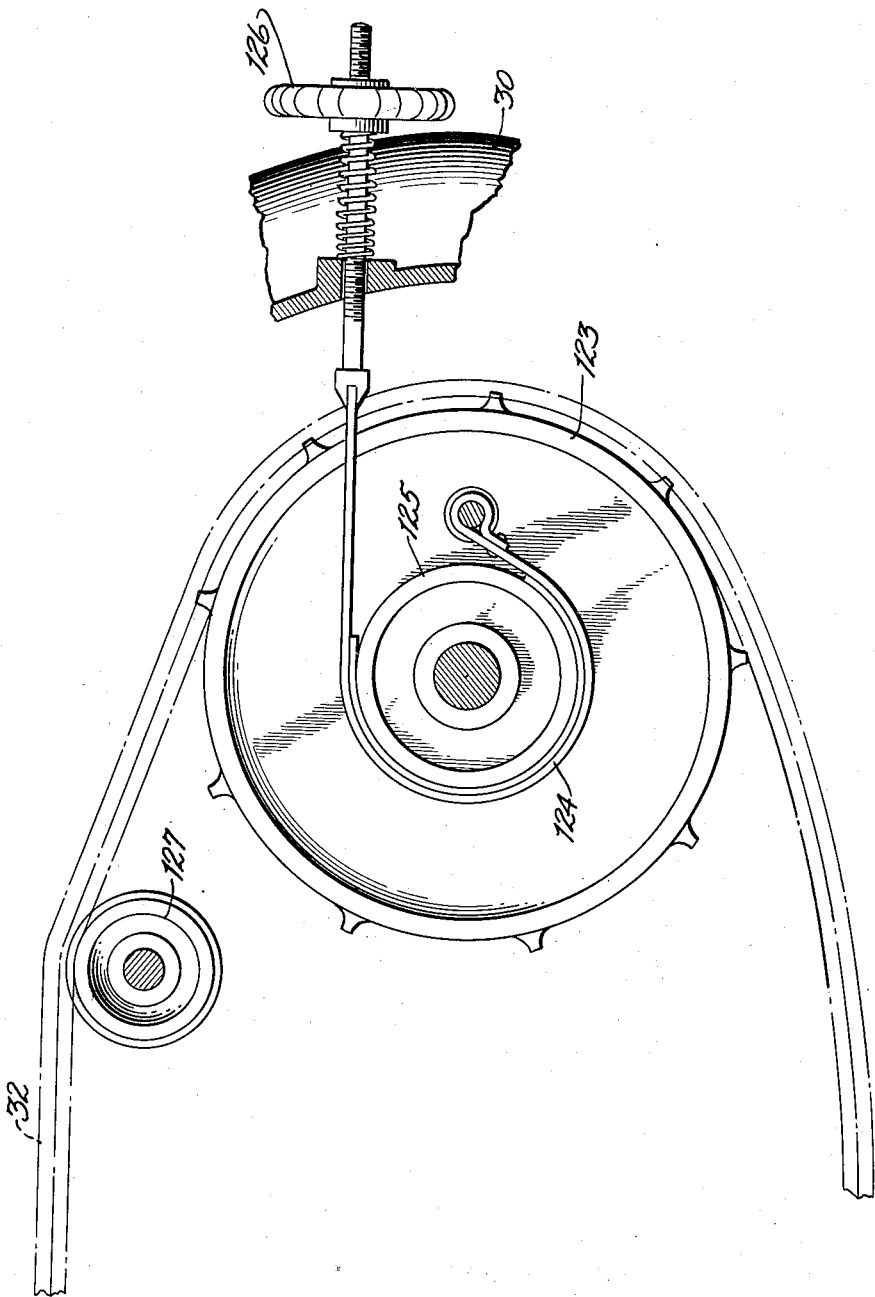

Patented Aug. 18, 1931

1,819,746

UNITED STATES PATENT OFFICE

JAMES H. GRAHAM AND GEORGE G. GUNDERSON, OF MADISON, WISCONSIN, ASSIGNORS TO FRENCH BATTERY COMPANY, OF MADISON, WISCONSIN, A CORPORATION OF WISCONSIN

CORE WRAPPING MACHINE

Application filed April 2, 1928. Serial No. 266,854.

This invention relates to improvements in core wrapping machines, and more especially to a machine adapted for wrapping cores adapted for use in dry-cells, and the like. For example, a core for a dry-cell as now commonly used in flashlights, radio batteries, and the like, is usually formed of a cylindrically molded depolarized mix having embedded therein a carbon pencil. The mix may comprise any suitable chemicals, for example, it may be a mixture of carbon graphite, manganese dioxide, and one or more chlorides. These chemicals or others that may be used, are usually in powdered form, and in forming the core the mix is suitably compressed and formed to give the right density and shape. In order to hold this mix, which is usually of a pasty consistency, in suitable shape and form, it is desirable to wrap about the same some suitable covering, such as cloth, or the like.

Our improved machine is especially adapted for wrapping such a cloth covering about the core of a dry-cell, and means are provided for performing this work automatically with speed and efficiency.

Our improved core wrapping machine applies a piece of wrapping material substantially of rectangular shape to the cylindrical core. This piece of wrapper material is folded about the core, one edge being tucked under the other. The piece of wrapper material is of sufficient size so that when thus folded about the core there will be a projecting annulus or edge of such wrapper material at each end of the core. This projecting edge of wrapper material at the "top" of the core is crimped in around the projecting end of the carbon electrode, and the projecting edge of the wrapper material at the "bottom" of the core is folded in to cover that end of the core. The whole core is thus completely wrapped by the wrapping material except that the projecting end or button of the carbon electrode or pencil is left exposed.

Since the mix molded about the central carbon electrode or pencil, before being covered, is likely to be crushed or broken if not handled gently, our improved machine is so constructed that the cores, before being wrapped and in process of wrapping, are very gently and delicately handled by the machine so as not to disturb the mix which has been previously formed.

Other features and advantages of our invention will appear as we proceed with our application.

Figure 35:
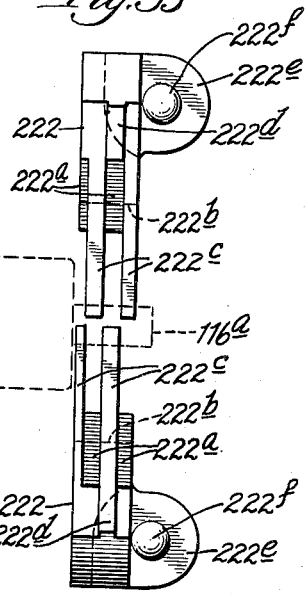
Figure 37:
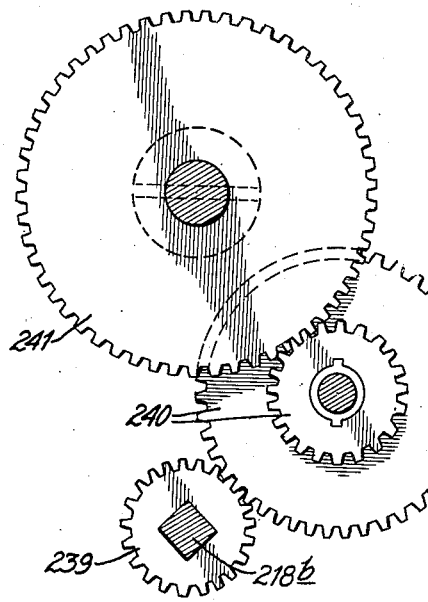
Figure 36:
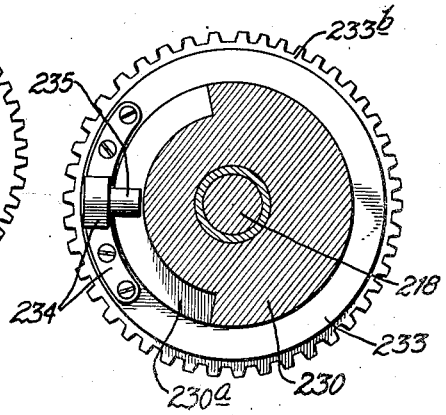

In that form of device embodying the features of our invention as shown in the accompanying drawings, Fig. 1 is a view in side elevation of the unit for applying an adhesive to the wrapping material; Fig. 2 is a view in side elevation of the complete machine, with the exception of the unit shown in Fig. 1; Fig. 3 is a plan view of the adhesive applying unit shown in Fig. 1; Fig. 4 is a view taken as indicated by the line 4 of Fig. 1; Fig. 5 is an enlarged view in cross-section of the wrapping material after the adhesive has been applied to it; Fig. 6 is a view taken as indicated by the line 6 of Fig. 2; Fig. 7 is a view taken as indicated by the line 7 of Fig. 6; Fig. 8 is a view taken as indicated by line 8 of Fig. 6; Fig. 9 is a view taken as indicated by the line 9 of Fig. 7; Fig. 10 is a vertical sectional view of the friction block used in connection with the wrapper material feeding mechanism; Fig. 11 is a view in side elevation of the wrapper material feeding mechanism; Fig. 12 is a similar view showing the parts in altered position; Fig. 13 is a view taken as indicated by the line 13 of Fig. 8; Fig. 14 is a view in front elevation of the parts shown in Fig. 13; Fig. 15 is a view taken as indicated by the line 15 of Fig. 14; Fig. 16 is a view in side elevation of a part of the sliding member in the core placing mechanism; Fig. 17 is a view of the core placing mechanism, partly in elevation and partly in section; Fig. 18 is a view taken as indicated by the line 18 of Fig. 17; Fig. 19 is a top plan view of the hopper holding the cores and the core releasing mechanism; Fig. 20 is a view in end elevation of a part of the mechanism for operating the folder devices; Fig. 21 is a view of the same in side elevation; Figs. 22, 23 and 24 are views in side elevation of the folder devices and tucker, showing the same in different positions; Fig. 25 is a view taken as indicated by the line 25 of Fig. 20; Fig. 26 is a view taken as indicated by the line 26 of Fig. 25; Fig. 27 is a top plan view, with parts broken away, showing the mechanism for operating the folder devices, tucker and mechanism for closing the ends of the wrapper; Fig. 28 is a view taken as indicated by the line 28 of Fig. 27; Fig. 29 is a view taken as indicated by the line 29 of Fig. 28; Fig. 30 is a view taken as indicated by the line 30 of Fig. 29; Fig. 31 is a view similar to Fig. 30, showing the parts in altered positions; Fig. 32 is a view taken as indicated by the line 32 of Fig. 28; Fig. 33 is a view taken as indicated by the line 33 of Fig. 27; Fig. 34 is a view taken as indicated by the line 34 of Fig. 33; Fig. 35 is a view in side elevation, on an enlarged scale, of the parts shown in Fig. 34; Fig. 36 is a view taken as indicated by the line 36 of Fig. 33; Fig. 37 is a view taken as indicated by the line 37 of Fig. 33; Figs. 38, 39, 40 and 41 are views of the end of the core showing four stages in the folder of the end of the wrapper over the end of the core; Fig. 42 is a view in side elevation of the mechanism for folding the end of the wrapper about the upper end of the core; Fig. 43 is a view taken on line 32 of Fig. 42; Fig. 44 is a similar view showing the parts in altered position; Fig. 45 is a view taken as indicated by the line 45 of Fig. 2; Fig. 46 is a fragmentary view taken as indicated by the line 46 of Fig. 2; Fig. 47 is a view in side elevation of the tail end of the machine showing the driving sprocket for the conveyor chain; Fig. 48 is a view taken as indicated by the line 48 of Fig. 47; Fig. 49 is a view taken as indicated by the line 49 of Fig. 47, and Fig. 50 is a view of the sprocket wheel carrying the conveyor chain at the head of the machine, showing the tension regulating mechanism and idler roller.

It will aid in understanding the construction and operation of the machine if a general description is given first. A long strip of wrapping material, for example, cheese cloth, is used. This is fed to the adhesive applying unit shown in Figs. 1, 3 and 4, and an adhesive, for example paraffin, applied to the lateral edges thereof, as shown in Fig. 5. This wrapping material, after the adhesive has thus been applied, is fed to the main machine where it is cut into rectangular pieces, each such piece serving as a wrapper for one core. It is to be noted that these rectangular pieces are folded about the core so that the edges with the adhesive will be at the ends of the core. That is, the edges of the wrapping material, which were the lateral edges of the original strip, after the piece is cut therefrom, become the edges at the ends of the wrapper for the core. In speaking of the rectangular piece of wrapper material after the same has been cut, therefore, when we speak about the "ends" of this piece, we refer to the portions lying adjacent the ends of the core. The sides or lateral edges of this piece, after the same has been cut, refer to the "cut edges" from the original long strip. Each rectangular piece is cut of such size that it may be folded about the core and one lateral edge tucked under the other so that the two lateral edges overlap. Each rectangular piece is also of such length so that there is a projecting annulus or marginal edge at each end of the core for enclosing the ends.

After being cut, the rectangular piece of wrapping material is positioned beneath the core placing device and above one of the folder devices carried on a suitable conveyor chain. The cores to be wrapped are located in a sort of inclined hopper, and releasing means are provided to free one at a time. A core so freed moves into position beneath the core placing device, and this device moves the same downwardly against the piece of wrapper to move the wrapper piece and the core into one of the folder devices. The operations just described are performed at one station.

The core is then moved to another station where the folder devices operate to fold the wrapper piece about the core, and a tucker finger tucks one lateral edge under the other. At this same station the projecting edge of the wrapper at the top end of the core is crimped in around the top of the core leaving the projecting end of the carbon pencil exposed, and the edge at the bottom of the core is folded in to cover this end of the core.

The core is then moved to the next station where the ends are spun. That is, the wrapping has been substantially completed, but the ends are smoothed off by rapidly rotating spinning members which serve to give the core its correct dimensions. Such rapidly spinning members may also slightly soften the paraffin and re-form the same to correct dimensions.

The core then moves to the next station where it is ejected from the machine.

It might be stated at this point that all the mechanism to be hereinafter described, with the exception of the adhesive applying unit, is mounted on a suitable base or bed 30 supported on suitable legs or pedestals 31. Longitudinally mounted on the bed 30 is a carrier or conveyor, here shown in the form of an endless chain 32 carried by a driving sprocket at one end of the bed and a tension wheel at the other end. Means are provided for moving the carrier intermittently step by step to bring the cores carried thereby into position at various stations where work in connection with the wrapping is performed. It is to be understood that work at the various stations is performed simultaneously on a plurality of cores.

Adhesive applying unit

The adhesive applying unit is best shown in Figs. 1, 3 and 4. This unit comprises a suitable standard or pedestal 10, a tank 11 containing the adhesive, for example paraffin 12, which is kept in a melted state in any suitable manner, as, for example, by means of an electric resistance coil 13. Suitably supported above the tank 11 by the bearings 14 on the upper edges of the side walls of the tank is a shaft 15 carrying at one end a driving wheel 16. The shaft also carries three drums, the outer two being indicated by 17, 17, and the center by 17ª. These drums are of sufficient diameter to cause their peripheries to extend to a point below the normal level of the paraffin 12. The peripheries of the two drums 17, 17, are permitted to dip into the paraffin 12, but the periphery of the center one 17ª is protected from the paraffin by means of a box or shield 18.

19 indicates a strip of the wrapper material which, for example, may be cheese-cloth, and this is fed to the adhesive applying device from a feed drum 20, rotation of which is checked by means of a friction belt 21 passing over the hub of the wheel. The wrapper material 19 is fed from the supply reel 20 over the tops of the drums 17, 17 and 17a (see Fig. 4). The peripheries of the drums 17 being immersed in paraffin carry some of this material upwardly and apply it to the peripheral edges of the strip 19 as it passes over so that as it leaves the adhesive applying unit it will appear in cross-section, as shown in Fig. 5 where the paraffin applied to the edges of the strip is indicated by 12a.

22 indicates a round leather driving belt adapted to drive the wheel 16. The power for driving the adhesive applying unit is derived from the wheel 23 over which the belt 22 passes (see Fig. 6). 24 indicates a roller carried by the two arms 25, 25, and adapted to rest on the strip 19 to hold the same in contact with the peripheries of the drums 17, 17, and 17a. 26, 26, indicate felt wipers supported by the springs 27 mounted on the support 27a and adapted to bear against the peripheral edges of the strip 19 to assist in impregnating the edges with paraffin and wipe off the surplus.

Mechanism for feeding wrapper material, cutting a piece therefrom, and placing core in folder device This mechanism is well shown in Figs. 6 to 18, inclusive.

In Fig. 7, the mechanism for feeding the wrapper material 19 from the adhesive applying unit to the cutting mechanism is shown. This comprises a reciprocating bar 33 carrying a feed finger 34 at the forward end adapted to move the material 19 forward, step by step, by its reciprocations. The bar 33 is actuated by a bell-crank 35 pivoted at 36 and actuated by a cam roller 37 lying in a cam groove 38 in the cam wheel 39. The wheel 39 is mounted on a shaft 40 which is driven by a spiral gear 41 actuated by the gear 42 mounted on a shaft 43, driven by mechanism to be hereinafter described. 44 indicates a spring finger pressing downwardly on the material 19 to prevent reverse movement thereof; and a similar finger or dog 45 is provided back of the member 33. In the forward movement (to the left as viewed in Fig. 7), the feed finger 34 is in contact with the cloth 19 and in the reverse movement it is raised. This is accomplished in the following manner: The arm 33 is pivotally attached to the bell-crank 35, at 33ª and near its forward end provided with a cross-bar 46 the ends of which are slightly squared, as indicated at 46ª, and ride upon the guides 47. These guides 47 are low enough to permit the lower end of the finger 34 to engage the cloth 19 in the forward movement, but high enough to prevent it from digging too deeply into the cloth. Resting on the guides 47 are two wedge shaped cams 48 carried on the forward ends of arms 49 pivotally attached at 50 to the adjustable brackets 51. In the forward movement of the finger 34 the ends of the cross-bar 46 ride on the guides 47 under the cams 48, such cams 48 rising to permit movement of the bar 46. In the return movement of the finger 34 the ends of the bars 46 ride up on the cams 48 to lift the finger 34 from the cloth 19. At the end of the reverse movement of the finger 34, the ends of the bar 46 drop off of the rear ends of the cams 48 permitting the finger 34 again to fall downwardly into engagement with the cloth 19 for the next forward movement of the feeding finger. The cam track 38 is shaped to give the arm 33 the necessary reciprocatory movement and the forward travel of the finger 34 in engagement with the cloth while feeding the same is of sufficient length to feed enough of the cloth 19 forward to permit the end of the same to be engaged by additional feeding mechanism to be described.

The end of the cloth 19 after being fed forward a short distance by the finger 34 is engaged by a pair of gripping rollers 52 and 53, the former preferably made of rubber and the latter of knurled metal. These rollers are mounted on the ends of two crossed arms 54, pivotally mounted at 55 on the friction block 56. The other ends of the arms 54 are pivotally attached at 57 to the toggle levers 58 carried by the draw-bar 59 mounted on the sliding block 60. The block 60 is reciprocated by mechanism to be hereinafter described in order to draw forward at each movement a sufficient length of material 19 to form a wrapper for one core. In the forward movement of the block 60, the toggle levers 58 operate to clamp the jaws 52 and 53 together to grip the end of the material 19 between. The block 56 being frictionally mounted assists in causing such gripping. In the return movement of the sliding block the jaws are similarly opened to be ready to again grip the cloth 19.

The block 60 is reciprocated in the following manner: The draw-bar 59 has slidably mounted thereon a ball 61 lying in a suitable socket 62 on the end of an arm 63 mounted on the lower end of a short shaft 64, mounted in the vertical bearing 64ª mounted on the bracket 65. The upper end of the shaft 64 carries an arm 66 with a cam 67 lying in a cam groove 68 on the cam 69 mounted on the shaft 43. Rotation of the cam 69 oscillates the members just described to move the block 60 to feed the cloth 19 forward one piece at a time as just described.

The knurled metal roller 53 is preferably somewhat loosely mounted on a shaft 53ª to permit slight movement of the same relatively to the shaft 53ª to cause more even engagement with the cloth 19. This loose mounting is accomplished by making the bore in the roller 53 somewhat larger than the shaft 53ª (see Fig. 9). The shaft 53ª is provided near its center with a raised rib 53ᵇ and also an equalizer pin 53ᶜ extending through the roller 53ª.

Fig. 10 shows the friction block 56. This block and also the block 60 slide on the guides 56ª. The block 56 is given the friction referred to by means of a friction shoe 56ᵇ pressed downwardly into frictional engagement with one of the guides 56ª by means of the springs 56ᶜ.

After a sufficient length of material to form a wrapper for one core has been fed forward, this piece of material is cut off by cutting-mechanism now to be described. 70 indicates a movable knife blade, pivoted at 71, and adapted to be moved into shearing relation with the stationary knife blade 72. The swinging end of the blade 70 is connected by a connecting rod 73 to one end of a lever 74 having its other end pivoted on the stationary rod 36. About midway its length, the lever 74 is provided with a cam roller 75 operating in a cam groove 76 in the cam wheel 77 mounted on the shaft 40 and rotated thereby. The parts are so timed and the cam groove is so shaped that after a piece of wrapper material has been fed forward by the feeding rollers 52 and 53, the knife 70 descends and cuts off such piece from the strip. The connecting rod 73 is preferably telescoped, the two parts being separated by a spring 73a in order to provide this connecting rod with a certain amount of resiliency.

Hereafter I shall indicate the piece of wrapper material cut from the strip by 19a. After the wrapper piece 19a is cut from the strip, one of the cores is fed into the core-placing device, and this mechanism pushes the core downwardly against the wrapper piece and places them both in one of the folder devices carried by the conveyor chain. The core-placing mechanism is located directly above the postion occupied by the wrapper piece 19a after it is cut from the strip. Just below the core-placing mechanism is a trap-door 78, pivoted at 79, normally held in closed position by means of the spring 80. Above the trap-door is a vertically slidable core-holder comprising two fingers 81 and 82, pivotally supported at 83 and 84, respectively, in the vertically slidable block 85 (see Figs. 17 and 18). The upper ends of fingers 81 and 82 are connected by means of the toggle levers 86 and 87, respectively, to the ends of a cross-bar 88. The cross-bar 88 is loosely mounted in the block 85 to permit a certain amount of vertical play therein in the opening 89. Downward movement of the bar 88 relatively to the block 85 will thus serve to bring the lower ends of the fingers 81 and 82 together, and upward movement will separate the same.

The block 85 is adapted for vertical sliding movement in the guide member 90, the latter being provided with two V-shaped channels 91 and the block 85 with two V-shaped projections 92 sliding in said channels. 93 indicates a friction shoe mounted in the guide member 90 and pressed against the sliding block 85 by means of the spring 94 in order to cause yielding resistance to the sliding of the block 85 in the guide 90.

The finger 81 is preferably jointed at 95, the two parts being yieldingly held in alinement by means of the spring 96. This spring joint is for the purpose of affording a slight yielding resiliency to the end of the finger 81. The lower ends of the fingers 81 and 82 are provided with round discs, the latter being cut away on its lower front side through substantially 90° to form the sector shaped recess 82a. 97 indicates a cam shaped finger carried by the lower end of the block 85 adapted to engage the trap-door 78 and open the same when the block descends. 98 indicates a curved stop plate carried on the rear lower edge of the block 85 adapted to stop and place a core as it rolls into place between the fingers 81 and 82. The upper edge of the stop member 98, as indicated by 98a, is widened and serves as a separator plate for the front and rear portions of the block 85. The recess 82a is adapted to accommodate the projecting end of the carbon pencil on the core as the core rolls into place between the fingers 81 and 82, and permit withdrawal of the fingers from the core after the same is placed in the folder device.

The block 85 with the fingers 81 and 82 is raised and lowered by means of the arm 99, one end of the same being bifurcated as indicated by 99a to carry the sliding blocks 100 which have the cross-bar 88 between. The other end of the arm 99 is pivoted on the stationary shaft 36 and about midway its length is provided with a cam roller 101 operating in the cam groove 102 in the cam wheel 103 mounted on and rotated by means of the shaft 40.

104, 104, indicate the bottom slats of a slanting hopper containing a supply of cores to be wrapped, and 105, 105, indicate the side slats thereof. Above this slanting hopper is a releasing bar 106 pivoted at its upper end at 107 (see Fig. 19). The lower end of the bar 106 is pivotally attached at 108 to the lower end of a vertically slidable rod 109 carrying a pin 110 embraced by the bifurcated end of a lever 111, pivoted at 112. The bifurcated end of the lever 111 is yieldingly held downward by means of a spring 113. The other end of the lever 111 is provided with a cam roller 114 adapted to be engaged by the cam 115 on the shaft 43. At suitable intervals, the cam 115 engages the cam roller 114 to raise the releasing-bar 106, permitting a core 116 to roll from the lower end of the hopper onto the trap-door 78 and between the lower ends of the fingers 81 and 82, and against the stop member 98. The bar 106 is then pulled down by the spring 113 to hold the remaining cores in the hopper. The arm 99 then presses downwardly on the cross-bar 88 first closing the fingers 81 and 82 to grip the core therebetween and then lowering the entire block 85 to move the core downwardly, the cam 97 opening the trap-door 78. The core is then moved on downwardly until it engages the piece of wrapper material 19a, thus forcing the wrapper material with the core on top down into one of the folder devices on the conveyor chain, as indicated by the broken lines in Fig. 8. The core does not strike the wrapper piece 19a exactly in the middle, but a short distance behind so that the forward projecting edge of the wrapper material is somewhat longer than the rear edge after the wrapper and core are in place in the folder device.

*The folder devices*

One of the folder devices is well shown in Figs. 22, 23 and 24. A plurality of these devices are carried by the conveyor chain 32. Each comprises a lower stationary curved jaw 117 secured to the conveyor chain 32. The jaw 117 being curved presents a transverse groove adapted to receive the core 116. The stationary jaw 117 is equipped with front and rear jaws 118, 119, respectively, pivoted to the jaw 117 at 118a and 119a, respectively. 120 and 121 indicate springs yieldingly holding the jaws 118 and 119 in vertical or open position, as shown in Fig. 22. Reference to Fig. 22 will show one of the cores 116 in place in a folder device with a piece of wrapper material 19a folded U-shaped around the core 116, the advancing edge being indicated by 19b and the rear edge 19c, the first-named edge being somewhat wider than the second.

*Mechanism for moving conveyor chain*

This mechanism is well shown in Figs. 47 to 50, inclusive. As stated before, the chain 32 at the front end of the machine passes over a driving sprocket 122 and at the rear end over a supporting sprocket 123. 124 indicates a brake-band frictionally operating on a brake-drum 125 carried by the wheel 123. The band 124 is adapted to be tightened by means of tension wheel 126, as shown, in order to impose friction to the movement of the wheel 123. 127 indicates an idler wheel over which the chain 32 passes in order to take up slack.

The driving sprocket 122 is loosely mounted on a shaft 128. This shaft has keyed thereto a driving member 129, the key being indicated by 130. The driving member 129 is bifurcated to form two ears 129a, and each of these is provided with an adjusting screw 131 and locking nut 132. The ends of the adjusting screws 131 are adapted to bear against a lug 133 carried by one of the spokes 122a of the sprocket 122. The adjusting screws 131 permit a slight rotary adjustment of the sprocket wheel 122 forwardly or backwardly with respect to the driving member 129.

The shaft 128 is driven in the following manner. 134 indicates a collar keyed onto the shaft 128 by means of the key 135. This collar is provided with a flange 136 to which is mounted a lock-wheel 137 carrying a plurality of rollers 138.

139 indicates a hook shaped driving dog carried on the lower end of an arm 140, pivotally mounted at 141, on the lower end of the vertically movable rod 142 which carries at its upper end a cam roller 143 operating in the cam groove 144 of the cam wheel 145. 146 indicates a spring mounted on the lower end of the rod 145 serving to yieldingly press the hook 139 toward the rollers 138. The cam wheel 145 is mounted on the shaft 43 so that rotation thereof moves the hook 139 upwardly and downwardly. In its upward movement, the hook engages one of the rollers 138 to turn the wheel 122 one step forward in a counter-clockwise direction, as viewed in Fig. 47. The member 140 above the hooked end 139 is slanted, as indicated by 139a and in the downward movement of the hook this slanting surface rides over the roller 138 just engaged to bend the hook 139 outwardly to clear the raised roller below. The upper end of the slanting surface 139a is provided with a shoulder 193b, and when the upper roller 138 slips over this shoulder, the hook 139 is pushed inwardly by means of the spring 146 to engage the next roller.

The lock wheel 137 is provided with a plurality of notches 137a adapted to be engaged by a locking pin 147 carried on the lower end of a vertically slidable bar 149 carrying on its upper end a cam roller 149 operating in the cam groove 150 of the cam wheel 151 mounted on the shaft 43. The parts are so arranged and timed that after the chain is moved forward one step, the pin 147 is depressed into one of the notches 137a to hold the parts in position. The rod 148 is preferably telescoped, the two parts being separated by means of a spring 148a in order to afford a certain amount of resiliency.

The chain 32 is provided with projecting rollers 32a adapted to roll on the track members 152 mounted on the bed 30. The rollers 32a are also adapted to be engaged by the projecting teeth 122b of the driving sprocket 122 in the driving process.

Secondary heater

Before passing to the station where the wrapper is folded and tucked, the core with the wrapper about it is carried between a pair of electric heaters 153 (see Fig. 2). These heaters serve to soften the paraffin before the folding, tucking and crimping operations are performed, as hereinafter described.

Mechanism for folding and tucking the wrapper

This mechanism is well shown in Figs. 20 to 26, inclusive.

In general, this mechanism includes a pair of pivoted fingers 154, 155. The finger 154 engages the jaw 118 of the folder device to fold the advancing edge 19b of the wrapper around the core, and the finger 155 engages the jaw 119 to fold the other edge. There is also a tucker finger 156 (see Figs. 21 to 24) which descends obliquely about simultaneously with the movement of the finger 154. This tucker finger engages the top of the advancing edge 19b of the wrapper and tucks it under the edge 19c (see Fig. 23) so that as the jaw 119 folds the edge 19c over it will overlap the edge 19b. In the movement of the fingers 154, 155, the finger 154 operates in advance of the finger 155. The fingers 154 and 155 are pivotally mounted at 157 on a stationary pivot.

The finger 154 is provided with an extension beyond the pivot, indicated by 154a, having a slot 154b; and the finger 155 is likewise provided with such an extension 155a having a slot 155b.

158 indicates a vertically slidable block having a cam roller 159 lying in the cam groove 160 of the cam wheel 161; and 162 indicates a similar slidable block provided with a cam roller 163 lying in the cam groove 164 of the cam wheel 165. The block 158 carries slidably mounted therein for vertical movement a short shaft 166 provided with a pin 167 lying in the slot 155b. 168 indicates a spiral spring with its upper end attached to the block 158, and its lower end attached to a pin 169 inserted in the shaft 166. The spring 168 tends to pull the shaft 166 upwardly in the block 158. The block 162 is provided with a similar spring 170 having its lower end attached to a pin 171 in the vertically slidable shaft 172 which in turn is provided with a pin 173 lying in the slot 154b.

The cam wheels 161 and 165 are rotated in the following manner. They are carried on a transversely mounted coupling 174 squared on the inside as indicated by 175, such squared opening receiving the squared end 176 of the driving shaft 177 (see Fig. 28), which in turn is driven by a spiral gear 178 operated by a worm 179 on the motor shaft 180 which in turn is driven by the motor 181. The drive for the shaft 43, above referred to, is obtained by helical gear 182 mounted on the shaft 177 (see Fig. 28).

The tucking finger 156 is slidably mounted in the oblique guide 183, and provided with a pin 184 embraced by the forked end 185a of an arm 185 pinned on a shaft 186. 187 indicates another arm pinned on the shaft 186, which is provided with a cam roller 188 operated by the cam wheel 189. The cam wheel 189 is also mounted on the collar or coupling 174 and rotated thereby. 190 indicates a spiral spring having its upper end attached to the end 185a of the lever 185 and its lower end mounted on the guide 183. This spring serves to pull the arm 185 downwardly to hold the cam roller in contact with the cam.

The various cam surfaces are so formed and the parts so timed that after a core and one of the folder devices come into position, the finger 154 closes the jaw 118, the tucker finger 156 tucks the edge 19b under the edge 19c and the other finger 155 then closes the jaw 119 to complete the folding of the wrapper about the core. These successive operations are shown in Figs. 22, 23 and 24. The fingers 154, 155 and 156 are then withdrawn and the springs 120 and 121 open the jaws.

Mechanism for folding the bottom of the wrapper around the bottom of the core and crimping the top This mechanism operates at the same station where the wrapper is folded and tucked about the core, as described immediately above. The mechanism for folding the bottom and crimping the top is well shown in Figs. 28 to 44, inclusive.

We shall first describe the mechanism for folding the projecting margin of the wrapper material over the bottom of the core. In Fig. 28, the core in position is indicated by 116. 191 indicates a non-rotatable longitudinally slidable shaft having its end as indicated by 191a squared and mounted in the squared socket 192. 193 indicates a gear wheel rotatably mounted on the shaft 191 and meshing with the gear wheel 194 on the driving shaft 177. The gear 194 is wide enough to permit relative sliding movement between the two gears 193 and 194 without unmeshing the same. Attached to the gear 193 is a cam wheel 195 having a cam groove 196. 197 indicates a face plate having attached thereto three cam wheels 198, 199 and 200. The gear wheel 193, the cam wheel 195, the face plate 197, and the three cams 198, 199 and 200 are all keyed on the sleeve 201 by means of the key 202 so that they all turn together.

203 indicates a head pinned on the end of the shaft 191 by means of a pin 204. Pivotally mounted in this head, at 205, are four levers 206. The construction and operation of these levers are substantially the same, consequently but one will be described in detail. One end of the lever 206 is provided with a cam wheel 207 operating on the cam 198. The other levers are likewise provided with cam wheels operating on the cams 199 and 200, one of said cams operating two of such wheels. The other end of the lever 206 (see Fig. 30) has pivotally attached thereto at 208, a foot 209 adapted for sliding movement in the lateral guideways 210 formed in the end of the head 203. The foot 209 is provided with a pin 211, the ends of which slide in undercut guides 212 at the sides of the guideways 210. The inner ends of the undercut guides 212 are somewhat widened, as indicated by 212a so that as the foot 209 reaches the inner end of its travel, the toe end of the same, as indicated by 209a can be pressed outwardly a short distance by the spring 213.

The cams 198, 199 and 200 are so shaped and mounted on the sleeve 201 that the four feet 209 will operate in sequence upon the projecting marginal end of the wrapper piece 19a. The operations performed by the foot 209 are well shown in Figs. 38 to 41, inclusive, where it will be seen that first substantially the upper quarter of the projecting edge, as indicated by 19d, is folded against the end of the core, thence the lower quarter, as indicated by 19e, thence the righthand quarter, as indicated by 19f, and finally the remaining quarter, as indicated by 19g, is folded over the other three, thus completely enclosing the bottom end of the core, as shown in Fig. 41.

214 indicates a cam roller mounted on an adjustable bracket 215 projecting from the end of the housing 216. The cam roller 214 lies in the cam groove 196 of the cam wheel 195. As the wheel 195 turns the head carrying the foot 209 is alternately moved to position adjacent a core and away therefrom. The shaft 191 slides in the socket 192 to permit this movement. The parts are so timed that the feet are moved back out of position to allow a core to be moved into place and then moved up adjacent the bottom of said core to permit the folding operation, above described.

We shall now describe the mechanism for crimping in the projecting edge of the wrapper around the top of the core, leaving the projecting end of the carbon pencil exposed. This mechanism is well shown in Fig. 33, where the core is indicated by 116, 116a indicating the projecting end of the carbon pencil at the top of the core. 217 indicates a shaft with a squared end 217a inserted in and driven by the coupling or collar 174. Parallelly arranged with this shaft is a rotatably and longitudinally slidable shaft 218 carrying on its end a head 219, which in turn carries the auxiliary head 220 provided with a diametrically arranged slide 221 having mounted therein the two radially slidable crimping fingers 222.

The auxiliary head 220 is mounted on the head 219 to permit relative movement of the same. This is accomplished by providing the pins 223 on the auxiliary head 220, said pins being slidably mounted in sockets in the head 219. 224 indicates bolts similarly carried by the auxiliary head 220 and slidably mounted for sliding movement through holes in the head 219. These bolts are provided with springs 225 to exert a yielding pressure against the auxiliary head 220 forcing it away from the head 219.

The fingers 222 are well shown in Figs. 34 and 35. Each finger comprises a main triangular portion 222a with the apex thereof concavely curved, as indicated by 222b, to accommodate the end of the carbon pencil. The main portions 222a are provided with cooperating overlapping side wings 222c so that when the fingers are together, as shown in Fig. 34, the parts will be held substantially in the same plane. At the sides, the fingers are provided with projecting ribs 222d operating in undercut guideways 221a in the sides of the guide 221.

The fingers 222 are also provided with ears 222e carrying pins 222f which are engaged by the forked ends 226a of the levers 226, pivoted at 227 on the head 219. The levers 226 project beyond the pivots 227 and carry at their outer ends friction reducing balls 228 adapted to be engaged by a cone member 229 slidably but non-rotatably mounted on the shaft 218. The cone member 229 is attached to a cam wheel 230. Rotation is prevented by means of a radial pin 231 having its end resting on the guide 232. This guide permits sliding movement of the pin, but prevents rotation of the cam wheel 230.

The cam wheel 230 is provided with a cam groove 230a. 233 indicates a cam wheel mounted back of the cam wheel 230. Cam wheel 233 carries a bracket 234 which has a pin carrying a cam roller 235 lying in the cam groove 230a. The cam wheel 233 is also provided with a cam groove 233a. 236 indicates a cam roller lying in the same groove 233a. This roller 236 is mounted on a bracket 237 attached to the housing 216a. The roller and bracket 236 and 237 resemble the roller and bracket 214 and 215. The cam wheel 233 is rotatably mounted on the enlarged end 218a of the shaft 218 and carries a gear wheel 233b which in turn is driven by a gear 238 keyed on the shaft 217. The gear 238 is wide enough to permit sliding movement of the gear 233b therewith without unmeshing. The extreme rear end of the shaft 218, as indicated by 218a, is squared and slidably mounted in a driving gear 239 which in turn is driven by an intermediate compound gear 240, the latter being driven by a gear 241 pinned on the shaft 217. The gear 239 is rotatably mounted in a bearing in the case 216a.

The operation of the parts just described is as follows. The shaft 218 with the auxiliary head 220 is rapidly rotated or spun by the gears 239, 240 and 241, thus rapidly spinning the crimping fingers 222. Centrifugal force urges these fingers outward. The cam wheel 233 is driven by the gear 238 and the roller 236 operating in the groove 233a moves this cam backwards and forwards. This backward and forward movement moves the head 219 with the auxiliary head 220 at intervals backwards and forwards to move the fingers 222 at intervals into operative position with respect to the core 116. When the fingers 222 are in operative position, the cam roller 235 operating in the cam groove 230a moves the cone member 229 forwardly to spread apart the balls 228 to force the fingers into the position shown in Fig. 34 where they operate to crimp in the projecting edge of the wrapper member around the top of the core.

*Mechanism for spinning the ends*

The spinning operation is performed at the station following the station where the wrapper is folded and tucked around the core, the bottom end folded, and the top end crimped.

The spinning mechanism is well shown in Figs. 27 and 45. Before the actual spinning is commenced, the core is held in position by a clamping foot 242 carrying a soft rubber shoe 243. The foot is mounted on the lower end of a vertically slidable shaft 244 carried by the bracket 245. A spiral spring 246 yieldingly presses the foot downwardly. The upper end of the shaft 244 is pivotally attached at 247 to the arm 248 pivoted at 249 and having its free end provided with a roller 250 operating on the cam 251, the latter being carried by the shaft 43. At suitable intervals, the cam 251 is rotated to permit the foot 242 to descend to hold the core 116 in place. After the spinning operation has been completed, the cam 251 rotates to raise the foot to permit the core to be moved away.

While the core is held in position, as just described, two spinning heads operate on the ends thereof. The construction and operation of these spinning heads are substantially the same, consequently, we shall describe but one in detail. Practically the only difference between these heads is that the one operating on the top of the core is provided with a socket to accommodate the projecting end of the carbon pencil.

252 indicates one of the spinning heads provided with a rubber tip 253. 252a indicates a depression in the end of the head to accommodate the projecting end of the carbon pencil in the core. It is to be understood that the other head operating on the bottom of the core does not have such a depression. The head 252 is slidably but non-rotatably mounted on the end of a shaft 254. The mounting is accomplished by providing the head 252 with a rearwardly extending sleeve 252b into which the end of the shaft 254 telescopes. 255 indicates a spring urging the head 252 forwardly with respect to the shaft 254. The sleeve 252 is provided with slots 252c embracing the ends of a pin 256 carried by the shaft 254. The slots 252c limit the sliding movement of the head 252 with respect to the shaft 254.

The shaft 254 is rapidly rotated by means of a pinion 257 slidably but non-rotatably mounted thereon, said pinion being driven by a silent chain 258 passing over a sprocket wheel 259 carried by the shaft 217. The shaft 254 carries a collar 260 with a peripheral groove 261. 262 indicates a lever, pivoted at 263, having one end forked and provided with pins 264 with their ends lying in the groove 261. The other end of the lever 262 is provided with a cam roller 265 lying in a cam groove 266a in the cam wheel 266 mounted on the shaft 217. Rotation of the cam wheel 266 swings the lever 262 to cause the pins 264 to engage the sides of the groove 261 to slide the shaft 254 forwardly and backwardly to bring the spinning head into and out of operative position with respect to the top of the core. Sliding movement of the shaft 254 in the gear wheel 257 is permitted by means of a key 267.

As stated above, the head operating on the bottom of the core is substantially the same. The rubber tip on this head is indicated by 268 in Fig. 27. The shaft 271 on which this head is mounted is driven by a silent chain 269 from the sprocket wheel 270 mounted on the shaft 177 (see Fig. 28). The shaft 271 carrying this head is moved backwardly and forwardly by means of an arm (not shown), similar to the arm 262, said arm being actuated by the cam 272 on the shaft 177.

The parts are so timed that when a core 116 is stationary in place between the rubber tips 253 and 268 (see Fig. 27), the spinning heads will be moved into operative position where they will engage the ends of a core and spin the same to smooth up the end surfaces, bring the length of the core to exact dimensions, and slightly warm the paraffin to cause the same to set firmly. During the time that this spinning occurs, as stated above, the holding foot 242 is depressed to hold the core in position.

The ejector

After the spinning operation, the core moves to the next station where it is ejected. The ejector mechanism is well shown in Fig. 46. The ejecting mechanism includes an ejector bar 273 transversely slidably mounted in the bearing 274 and provided at its rear end with a pin 275 engaged by the lower forked end 276a of the lever 276 which is pivoted at 278. The upper end of the lever 278 carries a cam roller 279 operating in a cam groove 280a in the cam roller 280 mounted on the shaft 43. The parts are so timed that when the chain 32 is stationary with one of the cores 116 in position to be ejected, the cam wheel 280 moves through an arc causing the lever 277 to swing to move the ejector bar 273 to a position, as shown in Fig. 46, where core 116 is ejected from the conveyor chain onto a receiving shelf 281. Before the conveyor chain again moves, the cam wheel 280 rotates through a forward arc operating to withdraw the ejector bar 273 out of the path of the chain.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible in view of the prior art.

Instead of the means described for tucking the wrapper-end at the bottom of the core, one may employ a rotary tucking device operating upon the principle of that described for tucking the wrapper at the pencil-end of the core.

What we claim as new, and desire to secure by Letters Patent, is:

1. In combination; a carrier equipped with a series of folder devices, each comprising a plurality of pivotally connected jaws including a pair of outstanding jaws; a tucker device coacting with one of said outstanding jaws for effecting the wrapping of one lateral edge portion of a wrapper piece about a core; and means serving thereafter to close the other outstanding jaw and effect wrapping of the other lateral edge portion of the wrapper piece in overlapping relation.

2. In combination; means for cylindrically folding a wrapper piece about a core to leave projecting ends at the ends of the core; and means for folding the projecting end of the wrapper piece over the bottom end of the core, said means including a head, means for moving the head to a position adjacent the botttom end of the core, a plurality of slidable radially mounted feet carried by said head, and means for sliding the feet inwardly in sequence to fold portions of the projecting end of the wrapper piece against the bottom end of the core.

3. In combination; means for cylindrically folding a wrapper piece about a core to leave projecting ends at the end of the core; and means for crimping in the projecting ends of the wrapper piece over the top end of the core, said means including a rotatable head carrying a plurality of radially slidable crimping fingers, and means for moving the head into operative position adjacent the top end of the core and away therefrom.

4. In combination; means for cylindrically folding a wrapper piece about the core to leave projecting ends at the ends of the core; and means for crimping in the projecting end of the wrapper piece over an end of the core, said means including a rotatable head carrying a plurality of radially slidable flattened crimping fingers, said fingers being provided with overlapping side wings to hold the same in substantially the same place.

5. Apparatus as claimed in claim 4 in which the fingers are triangular in shape and provided with concaved recesses at their apices to conform to a carbon pencil.

6. In combination; means for cylindrically folding a wrapper piece about the core to leave projecting ends at the ends of the core; and means for crimping in the projecting end of the wrapper piece over an end of the core, said means including a rotatable head, an auxiliary head carried by the main head, and a plurality of radially slidable crimping fingers carried by the auxiliary head.

7. In combination; means for cylindrically folding a wrapper piece about the core to leave projecting ends at the ends of the core; means for folding the projecting end of the wrapper piece over the bottom end of the core; means for crimping in the projecting end of the wrapper piece over the top end of the core, and means for spinning the ends of said wrapper piece after said folding and crimping operations have been performed.

8. In a core wrapping machine; an endless conveyor equipped with a series of folder devices, said endless conveyor passing over a driving sprocket at one end; and means for rotating said driving sprocket, said means including a driving wheel, an adjustable connection between the driving wheel and the sprocket, and means for driving the driving wheel, said means including a plurality of pins on the driving wheel and a reciprocating hook member adapted to engage said pins in sequence in its movements in one direction.

9. In a core wrapping machine; an endless conveyor equipped with a series of folder devices, said endless conveyor passing over a driving sprocket at one end; means for rotating said driving sprocket, said means including a driving wheel, an adjustable connection between the driving wheel and the sprocket; and means for driving the driving wheel, said means including a plurality of pins on the driving wheel and a reciprocating hook member adapted to engage said pins in sequence in its movements in one direction and clear the same in its reverse movements.

10. In a core wrapping machine; an endless conveyor equipped with a series of folder devices, said endless conveyor passing over a driving sprocket at one end; means for rotating said driving sprocket, said means including a driving wheel, an adjustable connection between the driving wheel and the sprocket, and means for driving the driving wheel, said means including a plurality of pins on the driving wheel, and a reciprocating hook member adapted to engage said pins in sequence in its forward movements, said reciprocating hook member having a slanting cam surface adapted to contact with said pins to cause said hook member to disengage therefrom in its reverse movements.

11. Apparatus for the purpose set forth, comprising; mechanism for supporting a roll of strip material and applying adhesive to the lateral edges of a strip drawn therefrom; and mechanism for effecting the wrapping of dry-cell cores comprising; a series of intermittently actuated traveling folders; strip-drawing means adjacent the path of said folders; strip-severing means adapted to cut wrappers from the strip; a core-magazine; means for delivering a core from the magazine, positioning it with respect to a wrapper, and entering the core and wrapper into a folder; means adjacent the path of the folders for closing them, in turn, to effect circumferential wrapping; and means adjacent the paths of the ends of the folders for tucking the adhesive ends of the wrappers against the core-ends.

12. Apparatus of the character set forth comprising; mechanism for supporting a roll of strip material and applying fusible adhesive to the lateral edges thereof, said mechanism including a receptacle for the adhesive, a heating device associated therewith, and means for applying the fused adhesive to the lateral edges of the strip; and wrapping mechanism for applying dry-cell cores comprising; a series of intermittently actuated traveling folders; strip-drawing means adjacent the path of said folders; strip-severing means adapted to cut wrappers from the strip; a source of core-supply; means for delivering a core from said source, positioning it with respect to a wrapping, and entering the core and wrapper into a folder; folder-closing means for closing the folders, in turn, and effecting circumferential wrapping; and means for tucking the adhesive ends of the wrappers against the core-ends.

13. Apparatus as specified in claim 12, in combination with a local tucker device above the path of the folders and operative to tuck one lateral edge of the wrapper into position to be overlapped by the other lateral edge of the wrapper in the operation of the folder.

14. Apparatus for the purpose set forth, comprising; an adhesive-applying unit comprising a tank equipped with heating means for melting a fusible adhesive, an adhesive-applying drum over which a wrapping strip is adapted to pass, said drum adapted to apply adhesive to the lateral edges of said strip, means for rotating said drum reversely; and core-wrapping mechanism comprising a series of intermittently actuated traveling folders, strip-feeding means for drawing the strip from the adhesive-applying unit, means for heating the adhesive edge-portions of the strip, strip-severing means adapted to cut wrappers from the strip, a core-magazine, means for delivering a core from the magazine and entering it and a wrapper into a folder, means for closing the folders to effect circumferential wrapping, and means for tucking the adhesive ends of the wrappers against the core-ends.

15. In apparatus of the character set forth; an intermittently actuated conveyor equipped with a series of folders, each folder comprising a jaw mounted on the conveyor, and a pair of jaws pivotally connected with the first-mentioned jaw, means mounted at one station above the conveyor for delivering a dry-cell core and a wrapper into each folder, in turn, means disposed at another station above the conveyor for effecting closing of the folders to effect circumferential wrapping, and means adjacent the paths of the ends of the folders carrying radially slidable feet for tucking the projecting ends of the wrappers against the core-ends.

16. In combination; an intermittently actuated conveyor, a series of folders mounted thereon, each folder comprising a segmental jaw mounted on the conveyor and a pair of swinging jaws coacting therewith, means for drawing a strip having adhesive edges to a position above the front portion of the conveyor and for severing the strip into wrappers, means for feeding dry-cell cores successively to a position above the wrapper, means for lowering the core and wrapper into a folder, means operative to close the folders during the travel of the conveyor, and means carrying radially slidable feet operative to tuck the end-portions of the wrapper against the core-ends while the conveyor is at rest.

17. In a core-wrapping machine, a series of traveling folders, each folder comprising a series of pivotally related segmental jaws, a tucker adapted to cooperate with one of the jaws of the folders, in turn, to aid in effecting circumferential wrapping, means for tucking the end-portions of the wrapper against the core-ends, means for delivering wrappers to the folders, in turn, and means for delivering dry-cell cores to the wrappers, in turn, and lowering a core and wrapper into the appropriate folder.

18. In apparatus of the character set forth, an intermittently actuated conveyor equipped with a series of folders, means for delivering a wrapper and a dry-cell core to each folder at one station, means for effecting closing of the folders during the travel of the conveyor, and means carrying radially slidable feet for tucking the ends of the wrappers against the core-ends at another station.

19. In a core wrapping machine; mechanism for applying adhesive to a wrapper strip; means for cutting a wrapper piece from said wrapper piece; mechanism for feeding the wrapper strip to said cutting means; a folder device; means for feeding a core and wrapper piece into the folder device; means for actuating the folder device to fold the wrapper piece about the core; means for tucking and folding in the ends of the wrapper piece over the ends of the core; means for spinning the ends; and means for ejecting the core from the folder device.

20. Mechanism as claimed in claim 19, characterized by the provision of a heater to heat the adhesive before folding the wrapper piece about the core.

In witness whereof, we have hereunto set our hands this 15" and 27" days of March, 1928.

JAMES H. GRAHAM.
GEORGE G. GUNDERSON.